United States Patent
Sato et al.

(10) Patent No.: US 12,287,483 B2
(45) Date of Patent: Apr. 29, 2025

(54) OPTICAL MEMBER AND IMAGE DISPLAY APPARATUS

(71) Applicant: FUJIFILM Corporation, Tokyo (JP)

(72) Inventors: Hiroshi Sato, Minamiashigara (JP); Katsumi Sasata, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 584 days.

(21) Appl. No.: 17/824,506

(22) Filed: May 25, 2022

(65) Prior Publication Data

US 2022/0291511 A1     Sep. 15, 2022

Related U.S. Application Data

(63) Continuation of application No. PCT/JP2020/043330, filed on Nov. 20, 2020.

(30) Foreign Application Priority Data

Nov. 26, 2019  (JP) .................. 2019-213490

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0026* (2013.01); *G02B 27/286* (2013.01);
(Continued)

(58) Field of Classification Search
CPC ............... G02F 1/1313; G02F 1/13306; G02F 1/13718; G02F 1/133504; G02F 1/133524;
(Continued)

(56) References Cited

U.S. PATENT DOCUMENTS

2017/0299864 A1   10/2017   Vallius et al.
2018/0164480 A1    6/2018   Yoshida
(Continued)

FOREIGN PATENT DOCUMENTS

WO   WO 2017/180403 A1   10/2017
WO   WO 2018/156784 A1    8/2018
(Continued)

OTHER PUBLICATIONS

Japanese Notice of Reasons for Refusal for corresponding Japanese Application No. 2021-561371, dated May 16, 2023, with an English translation.

(Continued)

*Primary Examiner* — Sultan Chowdhury
(74) *Attorney, Agent, or Firm* — Birch, Stewart, Kolasch & Birch, LLP

(57) ABSTRACT

An optical member and an image display apparatus including the optical member. The optical member includes: a light guide element including a light guide plate, first and second incidence diffraction elements, and first and second emission diffraction elements; a wavelength selective retardation layer that functions as a retardation layer with respect to a specific wavelength range, and changes a polarized state of light diffracted by the first or second emission diffraction element; and a polarizer, in which the first and second emission diffraction elements are polarization diffraction elements and diffract light components such that the diffracted light components are polarized light components having opposite properties, the first and second emission diffraction elements, the wavelength selective retardation layer, and the polarizer overlap each other in a main surface of the light guide plate, and the wavelength selective retardation layer is provided between the light guide element and the polarizer.

20 Claims, 10 Drawing Sheets

(51) Int. Cl.
  *G02B 27/28* (2006.01)
  *G02F 1/1335* (2006.01)
  *G02F 1/13363* (2006.01)
  *G02F 1/137* (2006.01)

(52) U.S. Cl.
  CPC .. *G02F 1/133504* (2013.01); *G02F 1/133524* (2013.01); *G02F 1/133636* (2013.01); *G02F 1/133638* (2021.01); *G02F 1/13718* (2013.01)

(58) Field of Classification Search
  CPC ......... G02F 1/133636; G02F 1/133638; G02B 5/18; G02B 5/30; G02B 5/3083; G02B 27/01; G02B 27/017; G02B 27/0101; G02B 27/0103; G02B 27/0172; G02B 27/0174; G02B 27/0178; G02B 27/18; G02B 27/286; G02B 6/00; G02B 6/0013; G02B 6/002; G02B 6/0026; G02B 6/0028; G02B 6/0045; G02B 6/0046
  See application file for complete search history.

(56) References Cited

U.S. PATENT DOCUMENTS

| | | | |
|---|---|---|---|
| 2019/0257993 A1* | 8/2019 | Kim | G02F 1/133602 |
| 2020/0026087 A1* | 1/2020 | Cai | G02B 27/283 |
| 2020/0081170 A1 | 3/2020 | Saitoh et al. | |
| 2020/0081255 A1* | 3/2020 | Schultz | G02B 3/08 |
| 2021/0011295 A1 | 1/2021 | Sato et al. | |
| 2021/0026049 A1 | 1/2021 | Saitoh et al. | |
| 2021/0088703 A1 | 3/2021 | Saitoh et al. | |

FOREIGN PATENT DOCUMENTS

| | | |
|---|---|---|
| WO | WO 2018/212348 A1 | 11/2018 |
| WO | WO 2016/194961 A1 | 12/2018 |
| WO | WO 2019/060741 A1 | 3/2019 |
| WO | WO 2019/189586 A1 | 10/2019 |
| WO | WO 2019/189852 A1 | 10/2019 |
| WO | WO 2019/221294 A1 | 11/2019 |

OTHER PUBLICATIONS

Japanese Notice of Reasons for Refusal for corresponding Japanese Application No. 2021-561371, dated Oct. 3, 2023, with an English translation.

International Preliminary Report on Patentability and Written Opinion of the International Searching Authority (Forms PCT/IB/326, PCT/IB/373, and PCT/ISA/237) for International Application No. PCT/JP2020/043330, dated Jun. 9, 2022, with an English translation.

International Search Report (Form PCT/ISA/210) for International Application No. PCT/JP2020/043330, dated Jan. 12, 2021, with an English translation.

Kress et al., "Towards the Ultimate Mixed Reality Experience: HoloLens Display Architecture Choices," SID 2017 Digest, 2017, pp. 127-131, 5 pages total.

* cited by examiner

OPTICAL MEMBER AND IMAGE DISPLAY APPARATUS

CROSS-REFERENCE TO RELATED APPLICATIONS

This application is a Continuation of PCT International Application No. PCT/JP2020/043330 filed on Nov. 20, 2020, which claims priority under 35 U.S.C. § 119(a) to Japanese Patent Application No. 2019-213490 filed on Nov. 26, 2019. The above application is hereby expressly incorporated by reference, in its entirety, into the present application.

BACKGROUND OF THE INVENTION

1. Field of the Invention

The present invention relates to an optical member in which light is incident, propagates, and is emitted and an image display apparatus including the optical member.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is diffracted (refracted) using a diffraction element to be incident into one end part of a light guide plate. As a result, the light is introduced into the light guide plate at an angle such that the light propagates in the light guide plate. The light propagated in the light guide plate is also diffracted by the diffraction element in the other end part of the light guide plate and is emitted from the light guide plate to an observation position by the user.

In addition, in AR glasses described in WO2017/180403A, for example, an image consisting of light components of three colors including red (R), green (G), and blue (B) is emitted from a display, and each of the light components is diffracted, propagates in one light guide plate, and is emitted from the light guide plate to an observation position of a user by a diffraction element such that the three color images are superimposed on each other and are displayed. As a result, a color image can be displayed.

SUMMARY OF THE INVENTION

As is well known, the angle of diffraction of light of a diffraction element depends on a wavelength of light and a period of a periodic structure. That is, a traveling direction of light diffracted by a diffraction element varies depending on the wavelength of the light. Therefore, in a case where a color image is displayed by one light guide plate, it is preferable that diffraction elements having periods of periodic structures corresponding to respective colors are laminated on the emission side.

However, according to an investigation, the present inventors found that, in a case where emission side diffraction elements corresponding to the respective colors are disposed to overlap each other to display a color image, there is a problem in that multiple images occur.

Specifically, in AR glasses, for example, in a case where images consisting of red, green, and blue light components are superimposed on each other to display a color image, for example, the green light is diffracted by a G diffraction element for diffracting green light, and a part of the green light is also diffracted by a R diffraction element for diffracting red light and/or a B diffraction element for diffracting blue light. At this time, the G diffraction element is different from the R diffraction element and the B diffraction element in the period of the diffraction structure.

Here, as described above, the diffraction angle of the diffraction element depends on the period of the diffraction structure of the diffraction element and the wavelength of light.

Therefore, the green light diffracted by the G diffraction element, the green light diffracted by the R diffraction element, and the green light diffracted by the B diffraction element are diffracted at different angles. Likewise, regarding the red light and the blue light, a part thereof is diffracted at different angles by diffraction elements other than the corresponding diffraction element. As a result, multiple images occur and are visually recognized.

An object of the present invention is to solve the above-described problems in the related art and is to provide an optical member in which the occurrence of multiple images can be suppressed for use in AR glasses or the like and an image display apparatus including this optical member.

In order to achieve the object, an optical member according to an aspect of the present invention has the following configurations.

[1] An optical member comprising:
  a light guide element that includes a light guide plate, a first incidence diffraction element, a second incidence diffraction element, a first emission diffraction element, and a second emission diffraction element;
  a wavelength selective retardation layer that functions as a retardation layer with respect to polarized light in a specific wavelength range, the wavelength selective retardation layer changing a polarized state of light diffracted by the first emission diffraction element or light diffracted by the second emission diffraction element; and
  a polarizer,
  in which the first emission diffraction element and the second emission diffraction element are polarization diffraction elements and diffract light components such that the diffracted light components are polarized light components having opposite properties,
  the first emission diffraction element, the second emission diffraction element, the wavelength selective retardation layer, and the polarizer are provided to overlap each other in a main surface of the light guide plate, and
  the wavelength selective retardation layer is provided between the light guide element and the polarizer.

[2] The optical member according to [1],
  in which at least one of a configuration in which the wavelength selective retardation layer is disposed to be spaced from the light guide element or a configuration in which the polarizer is disposed to be spaced from the wavelength selective retardation layer is satisfied.

[3] The optical member according to [1] or [2],
in which a period of a diffraction structure of the first incidence diffraction element and a period of a diffraction structure of the second incidence diffraction element are different from each other, and
a period of a diffraction structure of the first emission diffraction element and a period of a diffraction structure of the second emission diffraction element are different from each other.

[4] The optical member according to any one of [1] to [3],
in which the first emission diffraction element and the second emission diffraction element include a liquid crystal diffraction layer that is formed of a composition including a liquid crystal compound and has a liquid crystal alignment pattern in which a direction of an optical axis derived from the liquid crystal compound changes while continuously rotating in at least one in-plane direction.

[5] The optical member according to [4],
in which the liquid crystal diffraction layers of the first emission diffraction element and the second emission diffraction element have a region where the direction of the optical axis of the liquid crystal compound is helically twisted and rotates in a thickness direction, and
a helically twisted rotation direction of the optical axis in the liquid crystal diffraction layer of the first emission diffraction element is different from a helically twisted rotation direction of the optical axis in the liquid crystal diffraction layer of the second emission diffraction element.

[6] The optical member according to [4] or [5],
in which the liquid crystal diffraction layers of the first emission diffraction element and the second emission diffraction element include a cholesteric liquid crystal layer obtained by immobilizing a cholesteric liquid crystalline phase, and
a helically twisted rotation direction of the optical axis in the cholesteric liquid crystalline phase of the liquid crystal diffraction layer of the first emission diffraction element is different from a helically twisted rotation direction of the optical axis in the cholesteric liquid crystalline phase of the liquid crystal diffraction layer of the second emission diffraction element.

[7] The optical member according to any one of [4] to [6],
in which in the liquid crystal diffraction layers of the first emission diffraction element and the second emission diffraction element, in a case where an in-plane retardation is measured from a normal direction of a main surface and a direction tilted with respect to a normal line of the main surface, a direction in which the in-plane retardation is minimum in any one of a slow axis plane or a fast axis plane is tilted from the normal direction.

[8] The optical member according to any one of [1] to [7],
in which the wavelength selective retardation layer functions as a ½ wave plate with respect to the polarized light in the specific wavelength range.

[9] The optical member according to any one of [1] to [8],
in which a retardation layer is provided between the light guide element and the polarizer.

[10] The optical member according to [9],
in which the retardation layer is a ¼ wave plate.

[11] The optical member according to [9] or [10],
in which the retardation layer has reverse wavelength dispersibility.

[12] The optical member according to any one of [1] to [11],
in which periods of diffraction structures of the first incidence diffraction element, the second emission diffraction element, the first emission diffraction element, and the second emission diffraction element are 0.1 to 10 μm.

[13] The optical member according to any one of [1] to [12],
in which the first emission diffraction element and the second emission diffraction element are laminated.

[14] The optical member according to any one of [1] to [13],
in which the first incidence diffraction element and the second incidence diffraction element are laminated.

[15] The optical member according to any one of [1] to [14],
in which the first incidence diffraction element and the second incidence diffraction element are disposed at different positions in the main surface of the light guide plate.

[16] An image display apparatus comprising:
the optical member according to any one of [1] to [15]; and
a display element that emits an image to the first incidence diffraction element and the second incidence diffraction element of the light guide element of the optical member.

According to an aspect of the present invention, for example, in AR glasses, an image having no multiple images can be displayed.

DESCRIPTION OF THE PREFERRED EMBODIMENTS

Figure 1:
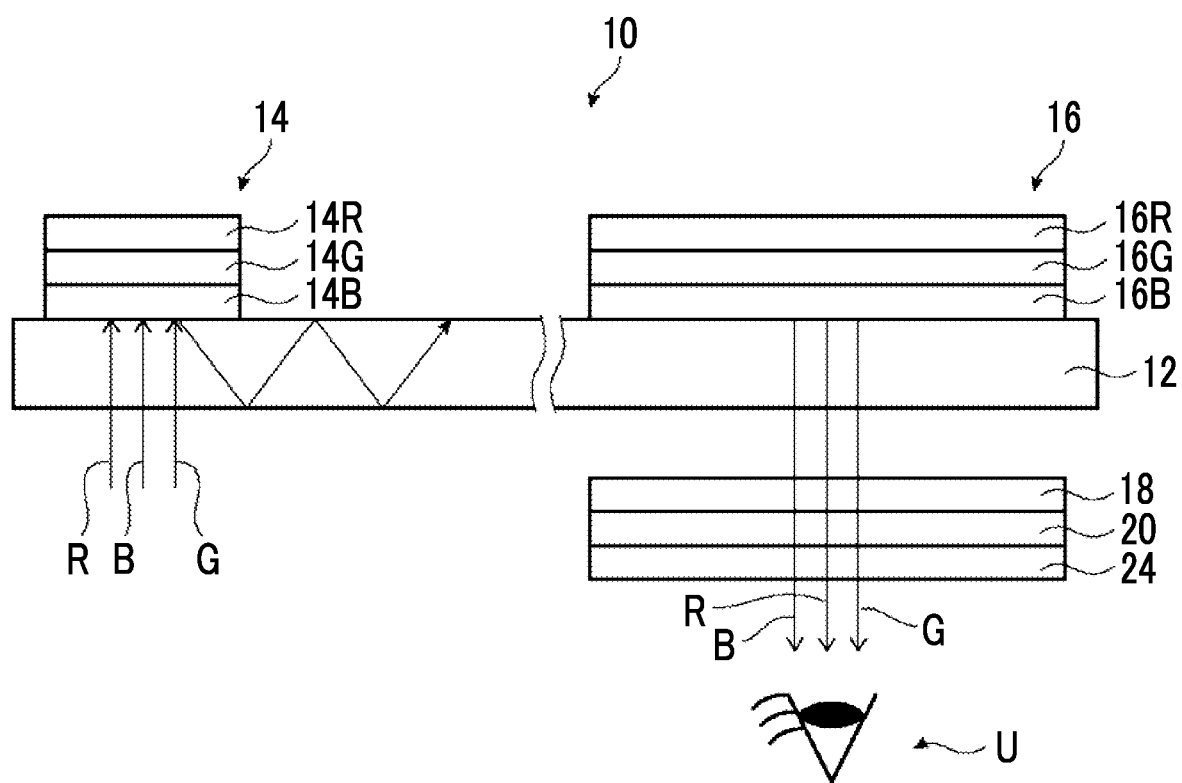
FIG. 1 is a diagram conceptually showing an example of an optical member according to the present invention.

Hereinafter, an optical member and an image display apparatus according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

In the present specification, visible light refers to light having a wavelength which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In the present specification, $Re(\lambda)$ represents an in-plane retardation at a wavelength $\lambda$. Unless specified otherwise, the wavelength $\lambda$ refers to 550 nm.

In the present specification, $Re(\lambda)$ is a value measured at the wavelength $\lambda$ using AxoScan (manufactured by Axometrics, Inc.). By inputting an average refractive index $((nx+ny+nz)/3)$ and a thickness (d (μm)) to AxoScan, the following expressions can be calculated.

Slow Axis Direction (°)

$$Re(\lambda)=R0(\lambda)$$

$R0(\lambda)$ is expressed as a numerical value calculated by AxoScan and represents $Re(\lambda)$.

The optical member according to the embodiment of the present invention includes: a light guide element that includes a light guide plate, a first incidence diffraction element, a second incidence diffraction element, a first emission diffraction element, and a second emission diffraction element; a wavelength selective retardation layer that functions as a retardation layer with respect to polarized light having a specific wavelength range; and a polarizer.

The wavelength selective retardation layer changes a polarized state of light diffracted by the first emission diffraction element or light diffracted by the second emission diffraction element.

The first emission diffraction element and the second emission diffraction element are polarization diffraction elements and diffract light components such that the diffracted light components are polarized light components having opposite properties.

Specifically, the polarized light components having opposite properties is polarized light positioned on the back side of the Poincare sphere with respect to one polarized light. In other words, a relationship between first polarized light and second polarized light corresponds to a relationship between a first point in a polarized state that is positioned on a surface of the Poincare sphere and a second point in a polarized state that is positioned on the surface of the Poincare sphere to be opposite to the first point with respect to the center of the Poincare sphere.

Specifically, the polarized light components having opposite properties are right circularly polarized light and left circularly polarized light in terms of circularly polarized light and are linearly polarized light components perpendicular to each other in terms of linearly polarized light, and examples thereof include P polarized light and S polarized light, vertical linearly polarized light and horizontal linearly polarized light, and 45° linearly polarized light and −45° linearly polarized light.

In addition, in the optical member according to the embodiment of the present invention, the first emission diffraction element, the second emission diffraction element, the wavelength selective retardation layer, and the polarizer are provided to overlap each other in a main surface (in a plane direction of the main surface) of the light guide plate. In other words, the first emission diffraction element, the second emission diffraction element, the wavelength selective retardation layer, and the polarizer are provided to overlap each other in a case of being seen from a normal direction of the light guide plate.

Further, the wavelength selective retardation layer is provided between the light guide element and the polarizer.

The main surface is the maximum surface of a sheet-shaped material (a plate-shaped material, a film, or a layer). In addition, the normal direction is a direction perpendicular to the main surface of the sheet-shaped material.

FIG. 1 conceptually shows an example of the optical member and the image display apparatus according to the embodiment of the present invention.

As shown in FIG. 1, an optical member 10 includes a light guide plate 12, an incidence diffraction unit 14, an emission diffraction unit 16, a retardation layer 18, a wavelength selective retardation layer 20, and a polarizer 24.

The incidence diffraction unit 14 is provided in the vicinity of one end part of one main surface of the light guide plate 12, and the emission diffraction unit 16 is provided in the vicinity of another end part of the same main surface of the light guide plate 12. The retardation layer 18, the wavelength selective retardation layer 20, and the polarizer 24 are provided in another main surface of the light guide plate 12 to overlap the emission diffraction unit 16 in the main surface of the light guide plate 12.

In the example shown in the drawing, the incidence diffraction unit 14 includes: an R incidence diffraction element 14R that selectively diffracts red (R) light; a G incidence diffraction element 14G that selectively diffracts green (G) light; and a B incidence diffraction element 14B that selectively diffracts blue (B) light.

On the other hand, the emission diffraction unit 16 includes: an R emission diffraction element 16R that selectively diffracts red light; a G emission diffraction element 16G that selectively diffracts green light; and a B emission diffraction element 16B that selectively diffracts blue light.

The light guide plate 12, the incidence diffraction unit 14 including the incidence diffraction elements, and the emission diffraction unit 16 including the emission diffraction elements form the light guide element according to the embodiment of the present invention.

In the optical member 10, the members that are laminated are optionally bonded to each other using a bonding layer.

As long as it has a sufficient light-transmitting property, the bonding layer may be a layer formed of an adhesive that has fluidity during bonding and becomes a solid after bonding, a layer formed of a pressure sensitive adhesive that is a gel-like (rubber-like) flexible solid during bonding and of which the gel state does not change after bonding, or a layer formed of a material having characteristics of both the adhesive and the pressure sensitive adhesive. Accordingly, the bonding layer may be any well-known layer that is used for bonding a sheet-shaped material in an optical device or an optical member, for example, an optical clear adhesive (OCA), an optically transparent double-sided tape, or an ultraviolet curable resin.

Alternatively, instead of bonding the members using the bonding layer, the members may be held using a frame, a jig, or the like to form the optical member according to the embodiment of the present invention.

All of the diffraction elements are reflective diffraction elements.

In the optical member 10 in the example shown in the drawing, a red image R, a green image G, and a blue image B in a color image displayed by a display element (not shown) transmit through the light guide plate 12 and are diffracted and reflected by the R incidence diffraction element 14R, the G incidence diffraction element 14G, and the B incidence diffraction element 14B of the incidence diffraction unit 14, respectively, to be incident into the light guide plate 12.

The red image R, the green image G, and the blue image B incident into the light guide plate 12 propagate in the light guide plate 12 while being repeatedly totally reflected, and is emitted to the emission diffraction unit 16.

The red image R, the green image G, and the blue image B incident into the emission diffraction unit 16 are diffracted and reflected by the R emission diffraction element 16R, the G emission diffraction element 16G, and the B emission diffraction element 16B of the emission diffraction unit 16, respectively, transmit through the light guide plate 12, transmit through the retardation layer 18, the wavelength selective retardation layer 20, and the polarizer 24, and are emitted to an observation position by a user U to be observed as a color image.

Hereinafter, each of the components forming the image display apparatus and the display element according to the embodiment of the present invention will be described.

Display Element

In the image display apparatus according to the embodiment of the present invention, as the display element (not shown), various well-known display elements (a display device or a projector) used for AR glasses or the like can be used without any particular limitation. Examples of the display element include a display element including a display and a projection lens.

In the image display apparatus according to the embodiment of the present invention, the display is not particularly limited. For example, various well-known displays used in AR glasses or the like can be used.

Examples of the display include a liquid crystal display, an organic electroluminescent display, and a scanning type display employing a digital light processing (DLP) or Micro Electro Mechanical Systems (MEMS) mirror. In the present invention, examples of the liquid crystal display include a liquid crystal on silicon (LCOS).

In the incidence diffraction unit 14, in a case where the incidence diffraction elements are laminated as in the example shown in the drawing, a display that displays a polychromic image using light components having wavelengths diffracted by the incidence diffraction elements is used.

In addition, as described below, in the incidence diffraction unit 14, in a case where the incidence diffraction elements are disposed at non-overlapping positions in the plane direction, a plurality of displays that emit monochromic images having wavelengths diffracted by the incidence diffraction element, respectively are used. In addition, in a case where a plurality of incidence diffraction elements are disposed at positions where they do not overlap each other in the plane direction, a configuration may be adopted in which light emitted from the display that displays a polychromic image is dispersed for each wavelength to be incident into the incidence diffraction element.

In the display element used in the image display apparatus according to the embodiment of the present invention, the projection lens is also a well-known projection lens (collimating lens) used for AR glasses or the like.

Here, in the image display apparatus according to the embodiment of the present invention, a display image by the display element, that is, light to be emitted from the display element is not limited and is preferably unpolarized light (natural light) or circularly polarized light.

In a case where the display element emits circularly polarized light and the display emits an unpolarized light image, and it is preferable that the display element includes, for example, a circular polarization plate consisting of a linear polarizer and an $\lambda/4$ plate. In addition, in a case where the display emits a linearly polarized light image, it is preferable that the display element includes, for example, a $\lambda/4$ plate.

The light to be emitted by the display element may be another polarized light (for example, linearly polarized light).

Light Guide Plate

The light guide plate 12 is a well-known light guide plate that reflects light incident thereinto and propagates (guides) the reflected light.

As the light guide plate 12, various well-known light guide plates used for a backlight unit or the like of AR glasses or a liquid crystal display can be used without any particular limitation.

Incidence Diffraction Unit and Emission Diffraction Unit

The incidence diffraction unit 14 includes the R incidence diffraction element 14R, the G incidence diffraction element 14G, and the B incidence diffraction element 14B. The R incidence diffraction element 14R and the B incidence diffraction element 14B are the first incidence diffraction elements according to the embodiment of the present invention, and the G incidence diffraction element 14G is the second incidence diffraction element according to the embodiment of the present invention.

In a preferable aspect, all of the R incidence diffraction element 14R, the G incidence diffraction element 14G, and the B incidence diffraction element 14B are reflective type polarization diffraction elements. Specifically, in a preferable aspect, each of the incidence diffraction elements includes a cholesteric liquid crystal layer as a liquid crystal diffraction layer that diffracts incidence light, and selectively reflects right circularly polarized light or left circularly polarized light.

The turning directions of circularly polarized light that are selectively reflected by the R incidence diffraction element 14R, the G incidence diffraction element 14G, and the B incidence diffraction element 14B, that is, the helical twisted directions of the liquid crystal compounds in the cholesteric liquid crystalline phases may be the same as or different from each other. It is preferable that the R incidence diffraction element 14R and the B incidence diffraction element 14B as the first incidence diffraction element selectively reflect circularly polarized light having the same turning direction and the G incidence diffraction element 14G as the second incidence diffraction element selectively reflects circularly polarized light having a turning direction opposite to that of the R incidence diffraction element 14R or the like. In addition, in the incidence diffraction elements and the corresponding emission diffraction elements described below, the turning directions of circularly polarized light that is selectively reflected may be the same as or different from each other.

In this example, for example, all of the R incidence diffraction element 14R, the G incidence diffraction element 14G, and the B incidence diffraction element 14B selectively reflect right circularly polarized light.

On the other hand, the emission diffraction unit 16 includes the R emission diffraction element 16R, the G emission diffraction element 16G, and the B emission diffraction element 16B. The R emission diffraction element 16R and the B emission diffraction element 16B are the first emission diffraction elements according to the embodiment of the present invention, and the G emission diffraction element 16G is the second emission diffraction element according to the embodiment of the present invention.

Accordingly, all of the R emission diffraction element 16R, the G emission diffraction element 16G, and the B emission diffraction element 16B are polarization diffraction elements, and the properties of polarized light diffracted by the R emission diffraction element 16R and the B emission diffraction element 16B are opposite to the properties of polarized light diffracted by the G emission diffraction element 16G. Specifically, in a preferable aspect, each of the emission diffraction elements includes a cholesteric liquid crystal layer as a liquid crystal diffraction layer that diffracts incidence light, and the R emission diffraction element 16R selectively reflects right circularly polarized light, the G emission diffraction element 16G selectively reflects left circularly polarized light, and the B emission diffraction element 16B selectively reflects right circularly polarized light.

In the optical member according to the embodiment of the present invention, each of the incidence diffraction unit 14 and the emission diffraction unit 16 are not limited to the configuration in which it includes the three diffraction elements corresponding to red light, green light, and blue light.

For example, each of the incidence diffraction unit 14 and the emission diffraction unit 16 may include two diffraction elements corresponding to red light and green light and may include two diffraction elements corresponding to green light and blue light. In a case where each of the incidence diffraction unit 14 and the emission diffraction unit 16 includes two diffraction elements, both of the two diffraction elements may be the first incidence diffraction elements or the second incidence diffraction elements and may be the first emission diffraction elements or the second emission diffraction elements.

In the present invention, regarding the incidence diffraction elements, the emission diffraction elements, and intermediate diffraction elements described below, "first" and "second" are assigned in order to distinguish between the diffraction elements and have no technical meaning.

Accordingly, in a case where the polarized light components of diffracted light by the emission diffraction elements have opposite properties, the diffraction elements that diffracts red light and blue light may be the second emission diffraction elements, and the diffraction element that diffracts green light may be the first emission diffraction element. In addition, a wavelength selective retardation layer 26 described below may act on only the light diffracted by the first emission diffraction element or may act on only the light diffracted by the second emission diffraction element.

The first incidence diffraction element, the first emission diffraction element, and a first intermediate diffraction element described below selectively diffract light having in the same wavelength range (color). Likewise, the second incidence diffraction element, the second emission diffraction element, and a second intermediate diffraction element described below selectively diffract light having in the same wavelength range.

The R incidence diffraction element 14R, the G incidence diffraction element 14G, and the B incidence diffraction element 14B have the same configuration and the R emission diffraction element 16R, the G emission diffraction element 16G, and the B emission diffraction element 16B have the same configuration, except that the wavelength ranges of light to be selectively reflected and/or the turning directions of circularly polarized light to be selectively reflected are different from each other.

Accordingly, in the following description, in a case where the diffraction elements do not need to be distinguished from each other, these diffraction elements will also be collectively referred to as "liquid crystal diffraction element".

Liquid Crystal Diffraction Element

The liquid crystal diffraction element will be described using FIGS. 2 to 4.

Figure 2:
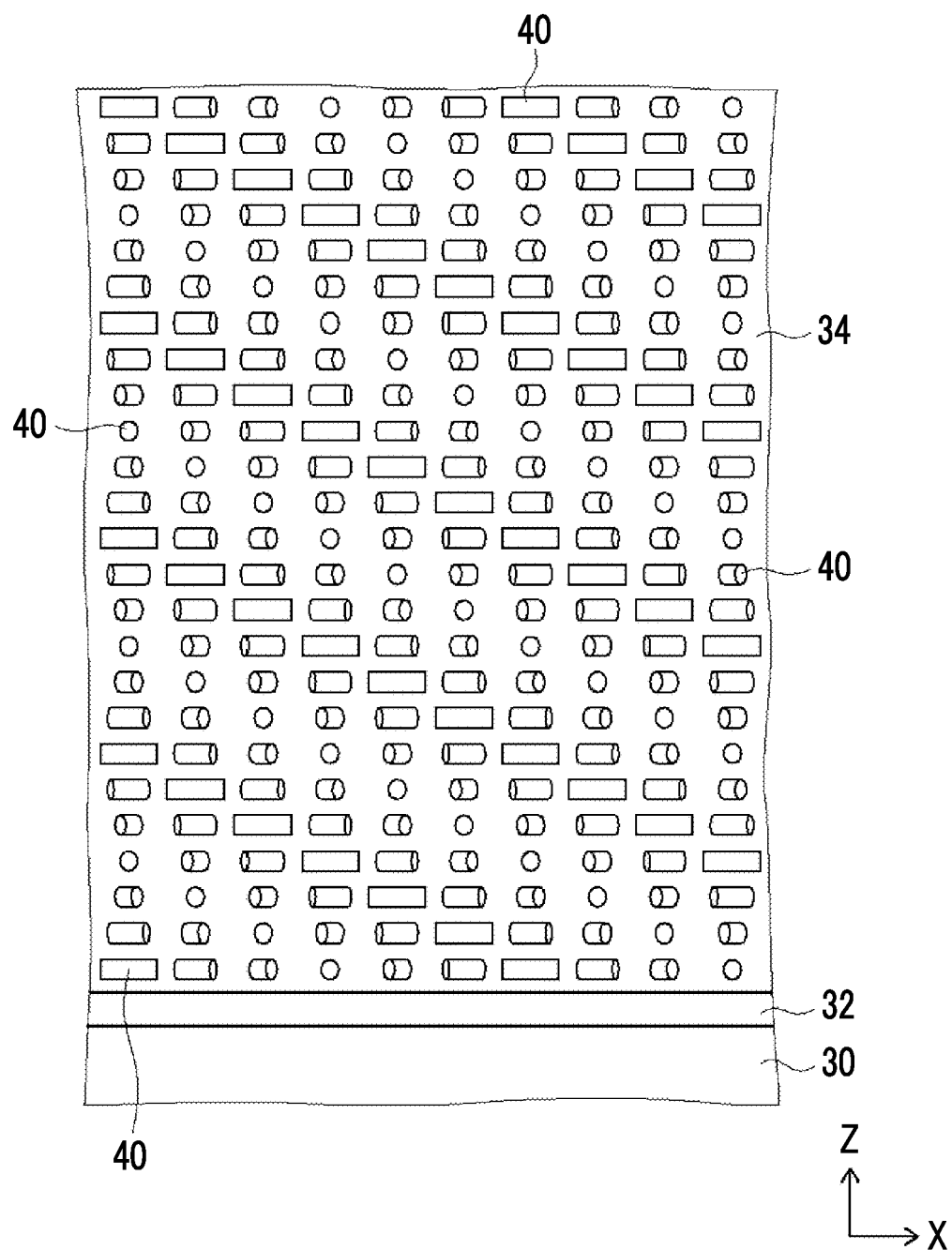
FIG. 2 is a diagram conceptually showing an example of a diffraction element.

FIG. 2 is a diagram conceptually showing a layer configuration of the liquid crystal diffraction element. As conceptually shown in FIG. 2, the liquid crystal diffraction element includes a support 30, an alignment film 32, and a cholesteric liquid crystal layer 34 as a liquid crystal diffraction layer that exhibits an action as a diffraction element.

Figure 3:
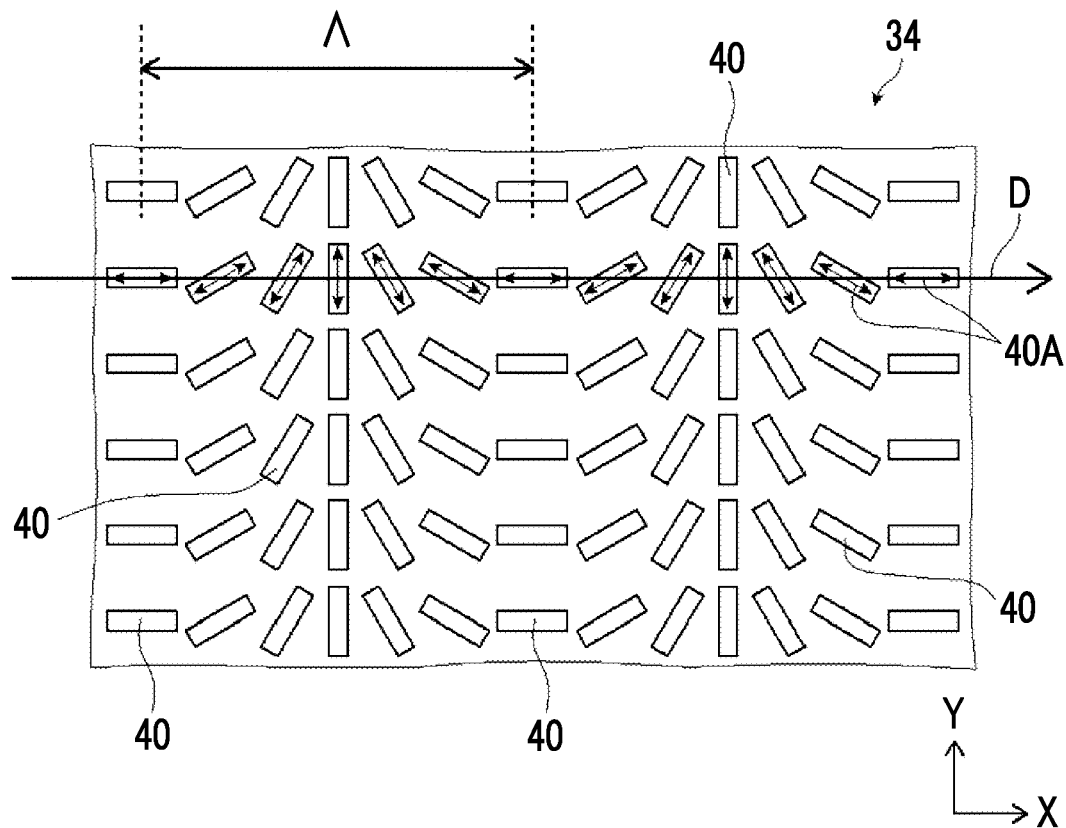
FIG. 3 is a plan view conceptually showing a liquid crystal layer of the diffraction element shown in FIG. 2.

FIG. 3 is a schematic diagram showing an alignment state of a liquid crystal compound in a plane of a main surface of the cholesteric liquid crystal layer 34.

In the following description, it is assumed that a main surface of the cholesteric liquid crystal layer 34 is an X-Y plane and a cross-section perpendicular to the X-Y plane is a X-Z plane. That is, FIG. 2 corresponds to a schematic diagram of the X-Z plane of the cholesteric liquid crystal layer 34, and FIG. 3 corresponds to a schematic diagram of the X-Y plane of the cholesteric liquid crystal layer 34.

Figure 4:
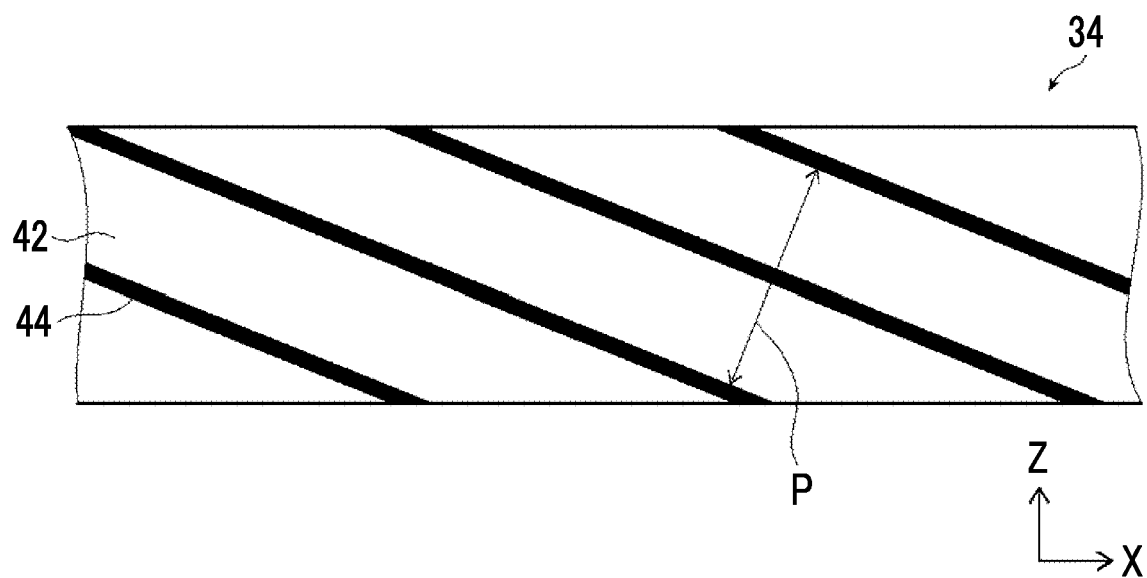
FIG. 4 is a diagram conceptually showing a cross-sectional scanning electron microscopic (SEM) image of the liquid crystal layer shown in FIG. 3.

As shown in FIGS. 2 to 4, the cholesteric liquid crystal layer 34 is a layer obtained by cholesteric alignment of a liquid crystal compound. In addition, FIGS. 2 to 4 show an example in which the liquid crystal compound forming the cholesteric liquid crystal layer is a rod-like liquid crystal compound.

In the following description, the cholesteric liquid crystal layer will also be referred to as "liquid crystal layer".

The liquid crystal diffraction element shown in FIG. 2 includes the support 30, the alignment film 32, and the liquid crystal layer 34. However, the present invention is not limited to this configuration. The liquid crystal diffraction element may include only the alignment film 32 and the liquid crystal layer 34 by peeling off the support 30 after bonding the laminate to the light guide plate 12. Alternatively, the liquid crystal diffraction element may include only the liquid crystal layer 34 by peeling off the support 30 and the alignment film 32 after bonding the laminate to the light guide plate 12.

Support

The support 30 supports the alignment film 32 and the liquid crystal layer 34.

As the support 30, various sheet-shaped materials (films or plate-shaped materials) can be used as long as they can support the alignment film 32 and the liquid crystal layer 34.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the liquid crystal diffraction element, a material for forming the support 30, and the like in a range where the alignment film 32 and the liquid crystal layer 34 can be supported.

The thickness of the support 30 is preferably 1 to 2000 μm, more preferably 3 to 500 μm, and still more preferably 5 to 250 μm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

Alignment Film

In the liquid crystal diffraction element, the alignment film 32 is formed on a surface of the support 30.

The alignment film 32 is an alignment film for aligning the liquid crystal compound 40 to a predetermined liquid crystal alignment pattern during the formation of the liquid crystal layer 34.

Although described below, in the present invention, the liquid crystal layer 34 has a liquid crystal alignment pattern in which a direction of an optical axis 40A (refer to FIG. 3) derived from the liquid crystal compound 40 changes while continuously rotating in one in-plane direction. Accordingly, the alignment film 32 is formed such that the liquid crystal layer 34 can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the liquid crystal diffraction element, for example, the alignment film 32 can be suitably used as a so-called photo-alignment film obtained by irradiating a photo-alignment material with polarized light or non-polarized light. That is, in the liquid crystal diffraction element, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 8:
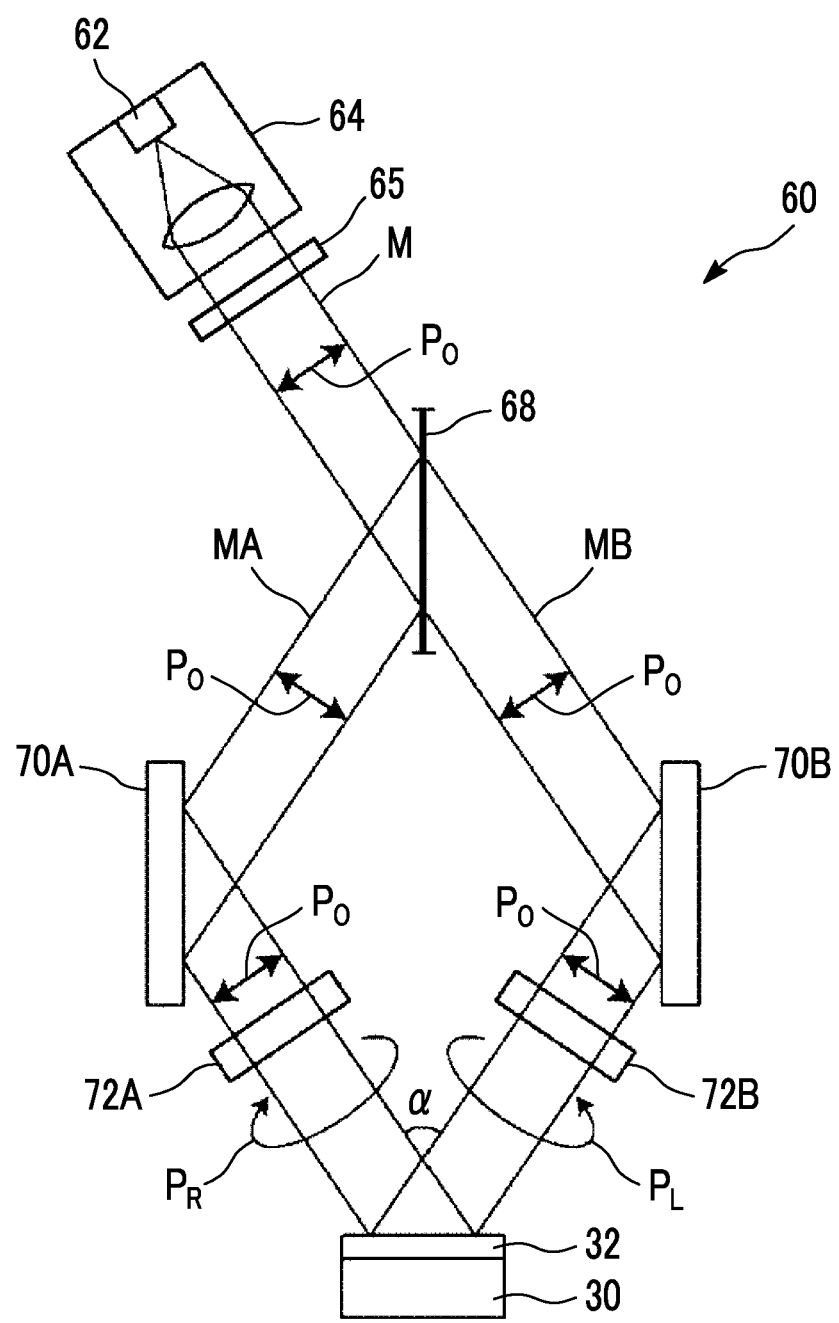
FIG. 8 is a conceptual diagram showing an example of an exposure device that exposes an alignment film.

FIG. 8 conceptually shows an example of an exposure device that exposes the alignment film 32 to form an alignment pattern.

An exposure device 60 shown in FIG. 8 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the two split beams MA and MB; and λ/4 plates 72A and 72B.

The light source 64 emits linearly polarized light P0. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarized state of light with which the alignment film 32 is irradiated periodically changes according to interference fringes. As a result, an alignment film having an alignment pattern in which the alignment state periodically changes can be obtained. In the following description, this alignment film having the alignment pattern will also be referred to as "patterned alignment film".

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the alignment film 32 having the alignment pattern in which the alignment state periodically changes, as described below, the liquid crystal layer 34 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has an alignment pattern to obtain the liquid crystal alignment pattern in which the liquid crystal compound is aligned such that the direction of the optical axis of the liquid crystal compound in the liquid crystal layer formed on the patterned alignment film changes while continuously rotating in at least one in-plane direction.

In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, the liquid crystal layer has the liquid crystal alignment pattern in which the direction of the optical axis 40A derived from the liquid crystal compound 40 changes while continuously rotating in at least one in-plane direction. That is, in the present invention, the support 30 may be made to function as the alignment film.

Liquid Crystal Layer (Cholesteric Liquid Crystal Layer)

In the liquid crystal diffraction element, the liquid crystal layer 34 is formed on a surface of the alignment film 32.

The liquid crystal layer 34 is a cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction.

As conceptually shown in FIG. 2, the liquid crystal layer 34 has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360°) and laminated is set as one helical pitch (pitch P), and plural pitches of the helically turned liquid crystal compound 40 are laminated.

As is well known, the cholesteric liquid crystalline phase exhibits selective reflectivity with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

Accordingly, in the emission diffraction unit 16, in the liquid crystal layer 34 forming the R emission diffraction element 16R and the B emission diffraction element 16B that selectively reflect right circularly polarized light, the helical twisted direction of the cholesteric liquid crystalline phase is the right direction. On the other hand, in the G incidence diffraction element 14G that selectively reflects left circularly polarized light, the helical twisted direction of the cholesteric liquid crystalline phase is the right direction.

The turning direction of the cholesteric liquid crystalline phase can be adjusted by adjusting the kind of the liquid crystal compound that forms the cholesteric liquid crystal layer and/or the kind of the chiral agent to be added.

In addition, a half-width Δλ (nm) of a selective reflection range (circularly polarized light reflection range) where selective reflection is exhibited depends on Δn of the cholesteric liquid crystalline phase and the helical pitch P and complies with a relationship of Δλ=Δn×P. Therefore, the width of the selective reflection range can be controlled by adjusting Δn. Δn can be adjusted by adjusting a kind of a liquid crystal compound for forming the cholesteric liquid crystal layer and a mixing ratio thereof, and a temperature during alignment immobilization.

Accordingly, regarding the wavelength of light that is reflected (diffracted) by the diffraction element, the selective reflection wavelength range of the liquid crystal layer may be set, for example, by adjusting the helical pitch P of the liquid crystal layer according to each of the liquid crystal diffraction elements.

The half-width of the reflection wavelength range is adjusted depending on the use of the optical member 10 and may be, for example, 10 to 500 nm and is preferably 20 to 300 nm and more preferably 30 to 100 nm.

As shown in FIG. 3, in the X-Y plane of the liquid crystal layer 34, the liquid crystal compounds 40 are arranged along a plurality of arrangement axes D parallel to the X-Y plane. On each of the arrangement axes D, the direction of the optical axis 40A of the liquid crystal compound 40 changes while continuously rotating in the one in-plane direction along the arrangement axis D. Here, for the convenience of description, it is assumed that the arrangement axis D is directed to the X direction. In addition, in the Y direction, the liquid crystal compounds 40 in which the directions of the optical axes 40A are the same are arranged at regular intervals.

"The direction of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from θ to θ+180° or θ−180° along the arrangement axis D. That is, in each of the plurality of liquid crystal compounds 40 arranged along the arrangement axis D, as shown in FIG. 3, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present specification, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound.

In the liquid crystal layer 34, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length Λ of the single period in the liquid crystal alignment pattern.

That is, a distance between centers of two liquid crystal compounds 40 in the arrangement axis D direction is the length Λ of the single period, the two liquid crystal compounds having the same angle in the arrangement axis D direction. Specifically, as shown in FIG. 3, a distance between centers in the arrangement axis D direction of two liquid crystal compounds 40 in which the arrangement axis D direction and the direction of the optical axis 40A match each other is the length Λ of the single period. In the following description, the length Λ of the single period will also be referred to as "single period Λ".

In the liquid crystal alignment pattern of the liquid crystal layer 34, the single period Λ is repeated in the arrangement axis D direction, that is, in the one in-plane direction in which the direction of the optical axis 40A changes while continuously rotating. In the liquid crystal diffraction element, the single period Λ is the period of the diffraction structure.

On the other hand, in the liquid crystal compound 40 forming the liquid crystal layer 34, the directions of the optical axes 40A are the same in the direction (in FIG. 3, the Y direction) perpendicular to the arrangement axis D direction, that is, the Y direction perpendicular to the one in-plane direction in which the optical axis 40A continuously rotates.

In other words, in the liquid crystal compound 40 forming the liquid crystal layer 34, angles between the optical axes 40A of the liquid crystal compound 40 and the arrangement axis D (X direction) are the same in the Y direction.

In a case where the X-Z plane of the liquid crystal layer 34 shown in FIG. 2 is observed with a scanning electron microscope (SEM), an arrangement direction in which bright portions 42 and dark portions 44 are alternately arranged as shown in FIG. 4, a stripe pattern tilted at a predetermined angle with respect to the main surface (X-Y plane) is observed. In this SEM cross-section, an interval between the bright portions 42 adjacent to each other or between the dark portions 44 adjacent to each other in a normal direction of lines formed by the bright portions 42 or the dark portions 44 corresponds to a ½ pitch. That is, as indicated by P in FIG. 4, two bright portions 42 and two dark portions 44 correspond to one helical pitch (one helical turn), that is, the pitch P.

Hereinafter, an action of diffraction of the liquid crystal layer will be described.

In a cholesteric liquid crystal layer of the related art, a helical axis derived from a cholesteric liquid crystalline phase is perpendicular to the main surface (X-Y plane), and a reflecting surface thereof is parallel to the main surface (X-Y plane). In addition, the optical axis of the liquid crystal compound is not tilted with respect to the main surface (X-Y plane). In other words, the optical axis is parallel to the main surface (X-Y plane). Accordingly, in a case where the X-Z plane of the cholesteric liquid crystal layer in the related art is observed with a SEM, an arrangement direction in which bright portions and dark portions are alternately arranged is perpendicular to the main surface (X-Y plane).

The cholesteric liquid crystalline phase has specular reflectivity. Therefore, in a case where light is incident from the normal direction into the cholesteric liquid crystal layer, the light is reflected in the normal direction.

Figure 5:
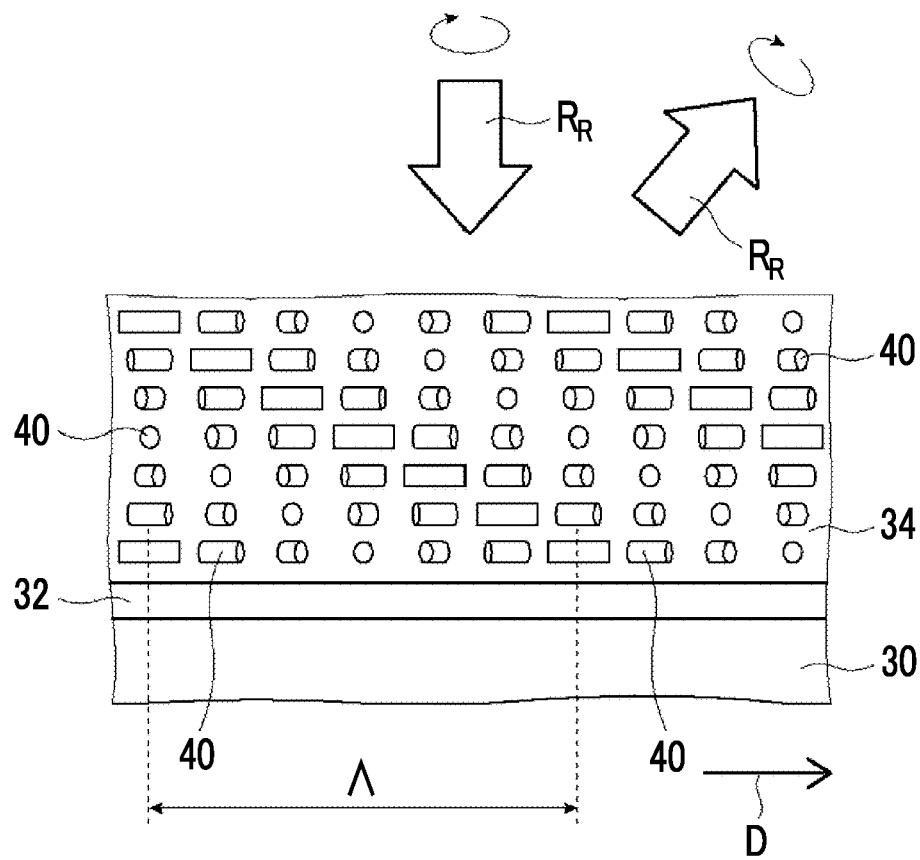
FIG. 5 is a conceptual diagram showing an action of the liquid crystal layer shown in FIG. 3.

On the other hand, the liquid crystal layer 34 reflects incident light in a state where it is tilted in the arrangement axis D direction with respect to the specular reflection. The liquid crystal layer 34 has the liquid crystal alignment pattern in which the optical axis 40A changes while continuously rotating in the arrangement axis D direction in a plane (the predetermined one in-plane direction). Hereinafter, the description will be made with reference to FIG. 5.

For example, it is assumed that the liquid crystal layer 34 is a cholesteric liquid crystal layer that selectively reflects right circularly polarized light $R_R$ of red light. Accordingly, in a case where light is incident into the liquid crystal layer 34, the liquid crystal layer 34 reflects only right circularly polarized light $R_R$ of red light and allows transmission of the other light.

Here, in the liquid crystal layer 34, the optical axis 40A of the liquid crystal compound 40 changes while rotating in the arrangement axis D direction (the one in-plane direction).

The liquid crystal alignment pattern formed in the liquid crystal layer 34 is a pattern that is periodic in the arrangement axis D direction. Therefore, as conceptually shown in FIG. 5, the right circularly polarized light $R_R$ of red light incident into the liquid crystal layer 34 is reflected (diffracted) in a direction corresponding to the period of the liquid crystal alignment pattern, and the reflected right circularly polarized light $R_R$ of red light is reflected (diffracted) in a direction tilted with respect to the XY plane (the main surface of the cholesteric liquid crystal layer) in the arrangement axis D direction.

As a result, in a case where the liquid crystal layer 34 is applied to a light guide element or the like, the liquid crystal layer 34 can be used as a diffraction element in which light incident from a direction perpendicular to the main surface of the light guide plate can be reflected (diffracted) at an angle at which total reflection occurs in the light guide plate and the light guided in the light guide plate by total reflection can e reflected (diffracted) in a direction perpendicular to the main surface of the light guide plate.

In the liquid crystal layer 34, by appropriately setting the arrangement axis D direction as the one in-plane direction in which the optical axis 40A rotates, the reflection direction (diffraction angle) of light can be adjusted.

In addition, in a case where circularly polarized light having the same wavelength and the same turning direction is reflected, by reversing the rotation direction of the optical axis 40A of the liquid crystal compound 40 toward the arrangement axis D direction, a reflection direction of the circularly polarized light can be reversed.

That is, in FIGS. 2 and 3, the rotation direction of the optical axis 40A toward the arrangement axis D direction is clockwise, and one circularly polarized light is reflected in a state where it is tilted in the arrangement axis D direction. By setting the rotation direction of the optical axis 40A to be counterclockwise, the circularly polarized light is reflected in a state where it is tilted in a direction opposite to the arrangement axis D direction.

Further, in the liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction is right-twisted, the liquid crystal layer selectively reflects right circularly polarized light, and has the liquid crystal alignment pattern in which the optical axis 40A rotates clockwise in the arrangement axis D direction. As a result, the right circularly polarized light is reflected in a state where it is tilted in the arrangement axis D direction.

In addition, for example, in a case where the helical turning direction is left-twisted, the liquid crystal layer selectively reflects left circularly polarized light, and has the liquid crystal alignment pattern in which the optical axis 40A rotates clockwise in the arrangement axis D direction. As a result, the left circularly polarized light is reflected in a state where it is tilted in a direction opposite to the arrangement axis D direction.

Accordingly, in the R incidence diffraction element 14R, the G incidence diffraction element 14G, and the B incidence diffraction element 14B forming the incidence diffraction unit 14, depending on the turning direction of circularly polarized light to be selectively reflected, that is, the helical turning direction, the arrangement axis D direction and the rotation direction of the optical axis 40A in the liquid crystal alignment pattern are set such that incident light is appropriately directed to the emission diffraction unit 16.

On the other hand, in the R emission diffraction element 16R, the G emission diffraction element 16G, and the B emission diffraction element 16B forming the emission diffraction unit 16, depending on the turning direction of circularly polarized light to be selectively reflected, that is, the helical turning direction, the arrangement axis D direction and the rotation direction of the optical axis 40A in the liquid crystal alignment pattern are set such that incident light is appropriately emitted to the observation position by the user U.

In the liquid crystal diffraction element, in the liquid crystal alignment pattern of the liquid crystal compound in the liquid crystal layer, the single period $\Lambda$ as the length over which the optical axis of the liquid crystal compound rotates by 180° is the period (single period) of the diffraction structure. In addition, in the liquid crystal layer, the one in-plane direction (arrangement axis D direction) in which the optical axis of the liquid crystal compound changes while rotating is the periodic direction of the diffraction structure.

In the optical member 10 according to the embodiment of the present invention, the length of the single period $\Lambda$ of the diffraction element is not particularly limited, and may be appropriately adjusted depending on the incidence angle into the light guide plate 12, the size of diffraction of light for emitting the light from the light guide plate 12, and the like.

The length of the single period of the diffraction element, in particular, the length of the single period $\Lambda$ of the emission diffraction element is preferably 0.1 µm to 10 µm, more preferably 0.1 µm to 1 µm, and still more preferably a wavelength $\lambda$ or less of incident light from the viewpoint of propagating light in the light guide plate 12 by total reflection.

In the liquid crystal layer having the liquid crystal alignment pattern, as the single period $\Lambda$ decreases, the angle of reflected light with respect to the incidence light increases. That is, as the single period $\Lambda$ decreases, reflected light can be reflected in a state where it is largely tilted with respect to incidence light.

In addition, in the liquid crystal layer having the liquid crystal alignment pattern, the reflection angle (diffraction angle) of light varies depending on the wavelength of light to be reflected. Specifically, as the wavelength of light increases, the angle of reflected light with respect to incidence light increases.

Accordingly, in the optical member 10 according to the embodiment of the present invention, in the R incidence diffraction element 14R, the G incidence diffraction element 14G, and the B incidence diffraction element 14B forming the incidence diffraction unit 14, it is preferable that a permutation of the selective reflection center wavelengths of the liquid crystal layers and a permutation of the single periods $\Lambda$ match each other. Likewise, in the R emission diffraction element 16R, the G emission diffraction element 16G, and the B emission diffraction element 16B forming the emission diffraction unit 16, it is preferable that a permutation of the selective reflection center wavelengths of the liquid crystal layers and a permutation of the single periods $\Lambda$ match each other.

Regarding this point, the same can be applied to the case where each of the incidence diffraction unit 14 and the emission diffraction unit 16 includes only two diffraction elements. In addition, regarding this point, the same can be applied to a case where the diffraction element is not a reflective liquid crystal diffraction element.

That is, in the incidence diffraction unit 14, the R incidence diffraction element 14R selectively reflects red light, the G incidence diffraction element 14G selectively reflects green light, and the B incidence diffraction element 14B selectively reflects blue light.

Accordingly, in a case where the selective reflection center wavelength of the R incidence diffraction element 14R is represented by $\lambda inR$, the selective reflection center wavelength of the G incidence diffraction element 14G is represented by $\lambda inG$, and the selective reflection center wavelength of the B incidence diffraction element 14B is represented by $\lambda inB$, "$\lambda inR>\lambda inG>\lambda inB$" is satisfied.

Accordingly, in the R incidence diffraction element 14R, the G incidence diffraction element 14G, and the B incidence diffraction element 14B, the single periods $\Lambda$ of the liquid crystal alignment patterns decrease in the order of the R incidence diffraction element 14R, the G incidence diffraction element 14G, and the B incidence diffraction element 14B.

That is, in a case where the single period $\Lambda$ of the liquid crystal alignment pattern of the R incidence diffraction element 14R is represented by $\lambda inR$, the single period $\Lambda$ of the liquid crystal alignment pattern of the G incidence diffraction element 14G is represented by $\lambda inG$, and the single period $\Lambda$ of the liquid crystal alignment pattern of the B incidence diffraction element 14B is represented by $\lambda inB$, it is preferable that "$\lambda inR>\lambda inG>\lambda inB$" is satisfied.

Likewise, in the emission diffraction unit 16, the R emission diffraction element 16R selectively reflects red light, the G emission diffraction element 16G selectively reflects green light, and the B emission diffraction element 16B selectively reflects blue light.

Accordingly, in a case where the selective reflection center wavelength of the R emission diffraction element 16R is represented by $\lambda outR$, the selective reflection center wavelength of the G emission diffraction element 16G is represented by $\lambda outG$, and the selective reflection center wavelength of the B emission diffraction element 16B is represented by $\lambda outB$, "$\lambda outR>\lambda outG>\lambda outB$" is satisfied.

Accordingly, in the R emission diffraction element 16R, the G emission diffraction element 16G, and the B emission diffraction element 16B, the single periods $\Lambda$ of the liquid crystal alignment patterns decrease in the order of the R emission diffraction element 16R, the G emission diffraction element 16G, and the B emission diffraction element 16B.

That is, in a case where the single period $\Lambda$ of the liquid crystal alignment pattern of the R emission diffraction element 16R is represented by $\lambda outR$, the single period $\Lambda$ of the liquid crystal alignment pattern of the G emission diffraction element 16G is represented by $\lambda outG$, and the single period $\Lambda$ of the liquid crystal alignment pattern of the B emission diffraction element 16B is represented by $\lambda outB$, it is preferable that "$\lambda outR>\lambda outG>\lambda outB$" is satisfied.

With this configuration, the incidence directions of the red image, the green image, and the blue image into the light guide plate 12 by the incidence diffraction unit 14 are made to match each other. Further, with this configuration, the emission directions of the red image, the green image, and the blue image from the emission diffraction unit 16 can be made to be the same. As a result, a color image having no color shift can be emitted from the light guide plate to the observation position by the user U of AR glasses.

In the example shown in FIG. 2, a configuration in which, on the X-Z plane of the liquid crystal layer 34, the optical axes 40A of the liquid crystal compound 40 is aligned to be parallel with respect to the main surface (X-Y plane) is adopted.

However, the present invention is not limited to this configuration. For example, as conceptually shown in FIG. 6, a configuration in which, on the X-Z plane of the liquid crystal layer 34, the optical axes 40A of the liquid crystal compound 40 is aligned to be tilted with respect to the main surface (X-Y plane) may be adopted.

Figure 6:
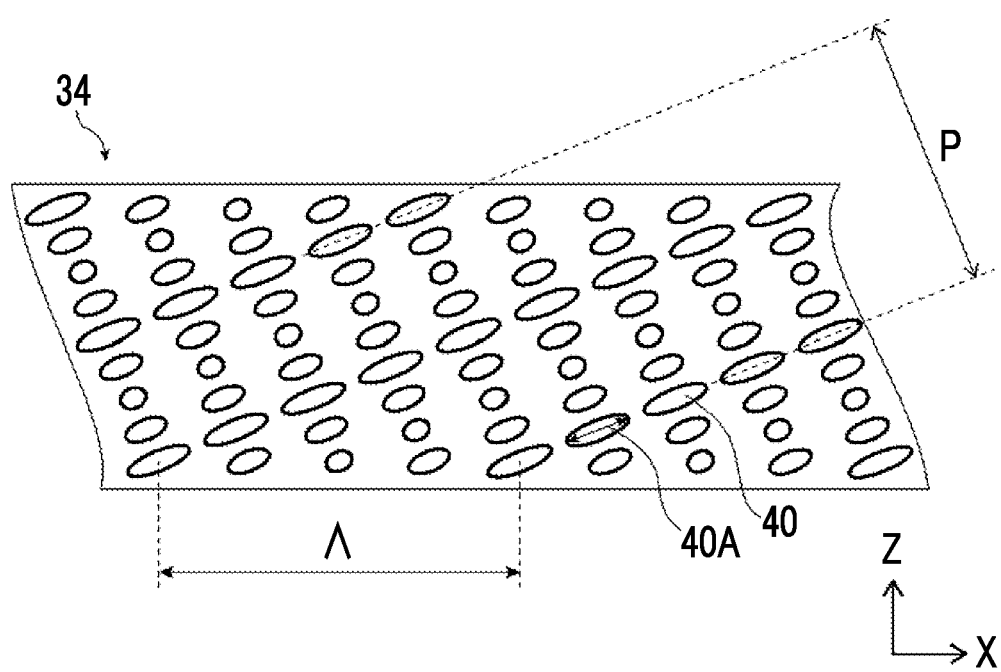
FIG. 6 is a diagram conceptually showing another example of the liquid crystal layer used in the diffraction element.

In addition, the example shown in FIG. 6 shows the configuration in which, on the X-Z plane of the liquid crystal layer 34, the tilt angle of the liquid crystal compound 40 with respect to the main surface (X-Y plane) is uniform in the thickness direction (Z direction). However, the present invention is not limited to this configuration. In the liquid crystal layer 34, a region where the tilt angle of the liquid crystal compound 40 varies in the thickness direction may be provided.

Figure 7:
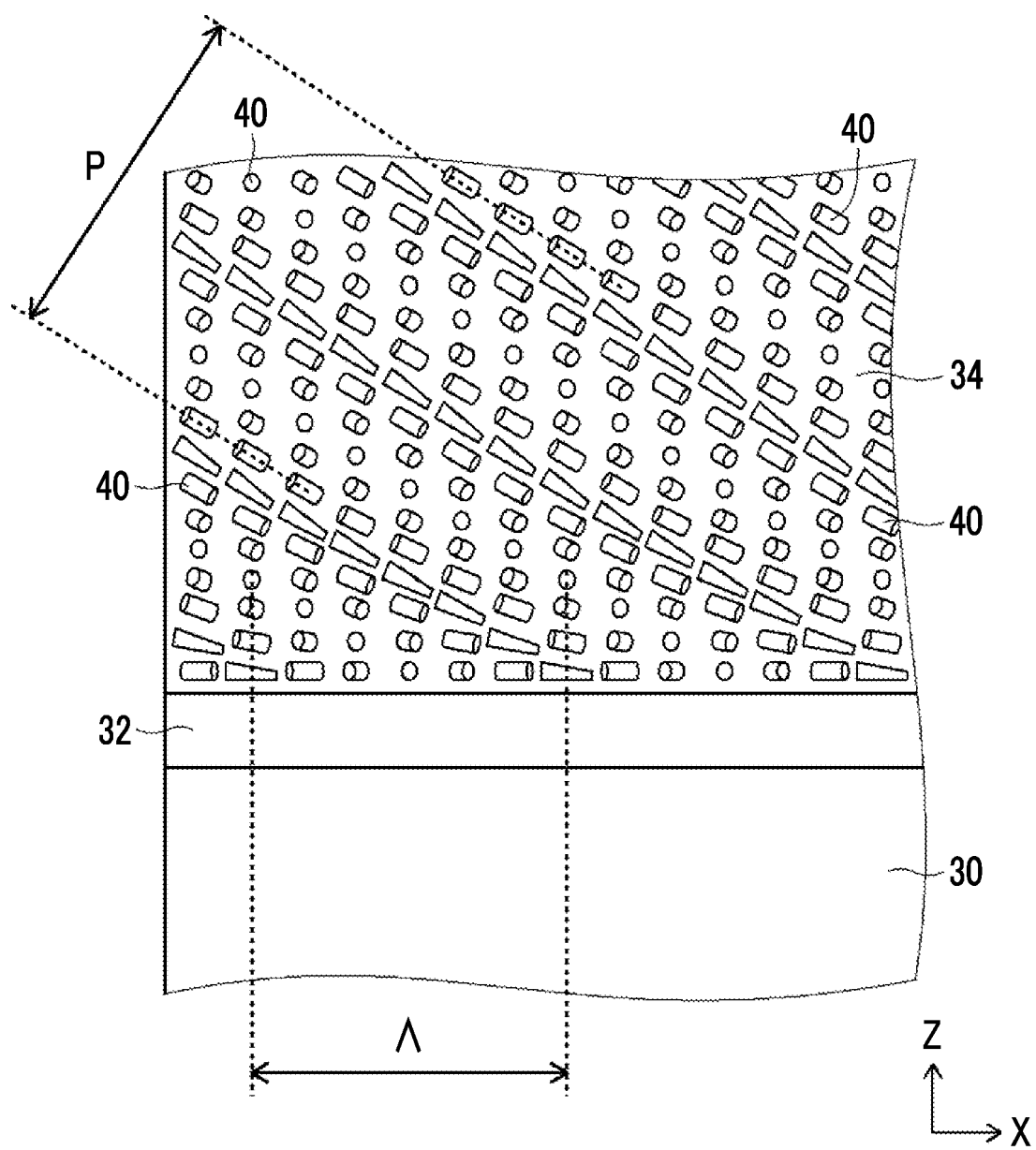
FIG. 7 is a diagram conceptually showing another example of the diffraction element.

For example, in an example shown in FIG. 7, the optical axis 40A of the liquid crystal compound 40 at an interface of the liquid crystal layer on the alignment film 32 side is parallel to the main surface (the pretilt angle is 0°), the tilt angle of the liquid crystal compound 40 increases in a direction away from the interface on the alignment film 32 side to the thickness direction, and the liquid crystal compound is aligned at a given tilt angle on another interface (air interface).

This way, the liquid crystal layer 34 may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

The liquid crystal compound has the tilt angle (is tilted). As a result, in a case where light is diffracted, the effective birefringence index of the liquid crystal compound increases, and the diffraction efficiency can be improved.

The average angle (average tilt angle) between the optical axis 40A of the liquid crystal compound 40 and the main surface (X-Y plane) is preferably 5° to 80° and more preferably 10° to 50°. The average tilt angle can be measured by observing the X-Z plane of the liquid crystal layer 34 with a polarization microscope. In particular, it is preferable that, on the X-Z plane of the liquid crystal layer 34, the optical axis 40A of the liquid crystal compound 40 is aligned to be tilted with respect to the main surface (X-Y plane) in the same direction.

In a case where the cross-section of the cholesteric liquid crystal layer is observed with a polarization microscope, the tilt angle is a value obtained by measuring the angle between the optical axis 40A of the liquid crystal compound 40 and the main surface at any five or more positions and obtaining the average value thereof.

Light that is vertically incident into the diffraction element (liquid crystal layer 34) travels obliquely in an oblique direction in the liquid crystal layer along with a bending force. In a case where light travels in the liquid crystal layer, diffraction loss is generated due to a deviation from conditions such as a diffraction period that are set to obtain a desired diffraction angle with respect to the vertically incident light.

In a case where the liquid crystal compound is tilted, an orientation in which a higher birefringence index is generated than that in an orientation in which light is diffracted as compared to a case where the liquid crystal compound is not tilted is present. In this direction, the effective extraordinary light refractive index increases, and thus the birefringence index as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is preferable that the tilt angle is controlled by treating the interface of the liquid crystal layer 34.

By pretilting the alignment film on the support side interface, the tilt angle of the liquid crystal compound can be controlled. For example, by exposing the alignment film to ultraviolet light from the front and subsequently obliquely exposing the alignment film during the formation of the alignment film, the liquid crystal compound in the liquid crystal layer formed on the alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present in a plane. This configuration is suitable for improving the diffraction efficiency because it contributes to the most improvement of birefringence in the desired direction in a case where light is diffracted in the direction.

Further, an additive for promoting the pretilt angle can also be added to the liquid crystal layer or to the alignment film. In this case, the additive can be used as a factor for further improving the diffraction efficiency.

This additive can also be used for controlling the pretilt angle on the air side interface.

Here, in a cross-section of the liquid crystal layer 34 observed with a SEM, the bright portions and the dark portions derived from a cholesteric liquid crystalline phase are tilted with respect to the main surface. In the liquid crystal layer, it is preferable that, in a case where an in-plane retardation Re is measured from a normal direction and a direction tilted with respect to a normal line, a direction in which the in-plane retardation Re is minimum in any one of a slow axis plane or a fast axis plane is tilted from the normal direction. Specifically, it is preferable that an absolute value of the measured angle between the direction in which the in-plane retardation Re is minimum and the normal line is 5° or more. In other words, it is preferable that the liquid crystal compound of the liquid crystal layer is tilted with respect to the main surface and the tilt direction substantially matches the bright portions and the dark portions of the liquid crystal layer. The normal direction is a direction perpendicular to the main surface.

By the liquid crystal layer having the above-described configuration, circularly polarized light can be diffracted with a higher diffraction efficiency than the liquid crystal layer in which the liquid crystal compound is parallel to the main surface.

In the configuration in which the liquid crystal compound of the liquid crystal layer is tilted with respect to the main surface and the tilt direction substantially matches the bright portions and the dark portions, bright portions and dark portions corresponding to a reflecting surface matches the optical axis of the liquid crystal compound. Therefore, the action of the liquid crystal compound on light reflection (diffraction) increases, the diffraction efficiency can be improved. As a result, the amount of reflected light with respect to incidence light can be further improved.

In the fast axis plane or the slow axis plane of the liquid crystal layer, the absolute value of the tilt angle of the optical axis of the liquid crystal layer is preferably 5° or more, more preferably 15° or more, and still more preferably 20° or more.

It is preferable that the absolute value of the tilt angle of the optical axis is 15° or more from the viewpoint that the direction of the liquid crystal compound matches the bright portions and the dark portions more suitably such that the diffraction efficiency can be improved.

Method of Forming Liquid Crystal Layer

The liquid crystal layer 34 can be formed by immobilizing a liquid crystal phase in a layer shape, the liquid crystal phase obtained by aligning a liquid crystal compound in a predetermined alignment state. For example, the cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a liquid crystal phase is immobilized. Typically, the structure in which a liquid crystal phase is immobilized is preferably a structure which is obtained by making the polymerizable liquid crystal compound to be in a state where a predetermined liquid crystal phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the liquid crystal layer include a liquid crystal composition including a liquid crystal compound. It is preferable that the liquid crystal compound is a polymerizable liquid crystal compound.

In addition, the liquid crystal composition used for forming the liquid crystal layer may further include a surfactant and a chiral agent.

Polymerizable Liquid Crystal Compound

The polymerizable liquid crystal compound may be a rod-like liquid crystal compound or a disk-like liquid crystal compound.

Examples of the rod-like polymerizable liquid crystal compound include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

Disk-Like Liquid Crystal Compound

As the disk-like liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

Surfactant

The liquid crystal composition used for forming the liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and "0082" to "0085" of JP2002-129162A, and fluorine (meth)acrylate polymers described in paragraphs "0018" to "0043" of JP2007-272185A.

The surfactants may be used alone or in combination of two or more kinds.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

Chiral Agent (Optically Active Compound)

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-

179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

Polymerization Initiator

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

Crosslinking Agent

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. These crosslinking agents may be used alone or in combination of two or more kinds.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

Other Additives

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. These organic solvents may be used alone or in combination of two or more kinds. Among these, a ketone is preferable in consideration of an environmental burden.

In a case where the liquid crystal layer is formed, it is preferable that the liquid crystal layer is formed by applying the liquid crystal composition to a surface where the liquid crystal layer is to be formed, aligning the liquid crystal compound to a state of a desired liquid crystal phase, and curing the liquid crystal compound.

That is, in a case where the cholesteric liquid crystal layer is formed on the alignment film 32, it is preferable that the liquid crystal layer obtained by immobilizing a cholesteric liquid crystalline phase is formed by applying the liquid crystal composition to the alignment film 32, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 mJ/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the liquid crystal layer 34 is not particularly limited, and the thickness with which a required light reflectivity can be obtained may be appropriately set depending on the use of the diffraction element, the light reflectivity required for the liquid crystal layer 34, the material for forming the liquid crystal layer 34, and the like.

Other Liquid Crystal Layers (Optically-Anisotropic Layers)

In the optical member in the example shown in the drawing, in the incidence diffraction unit 14 and the emission diffraction unit 16, a reflective liquid crystal diffraction element including the liquid crystal layer 34 as a cholesteric liquid crystal layer is used. However, the present invention is not limited to this configuration.

For example, a liquid crystal diffraction element that has the liquid crystal alignment pattern where the optical axis continuously rotates in at least one in-plane direction and in which the liquid crystal compound does not form a cholesteric liquid crystalline phase in the thickness direction can also be used. The liquid crystal diffraction element may have a configuration in which the liquid crystal compound is helically twisted and rotates in the thickness direction to some extent that a cholesteric liquid crystalline phase is not formed.

Figure 9:
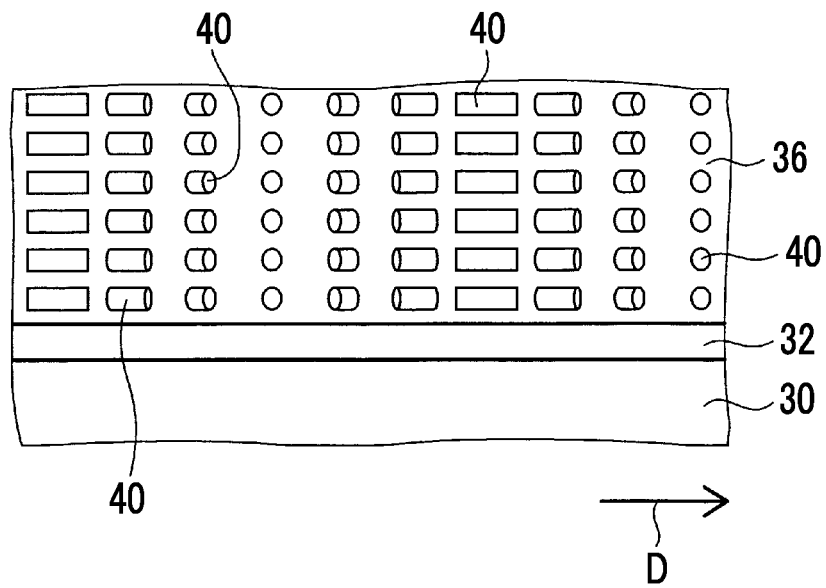
FIG. 9 is a diagram conceptually showing another example of the diffraction element.
Figure 10:
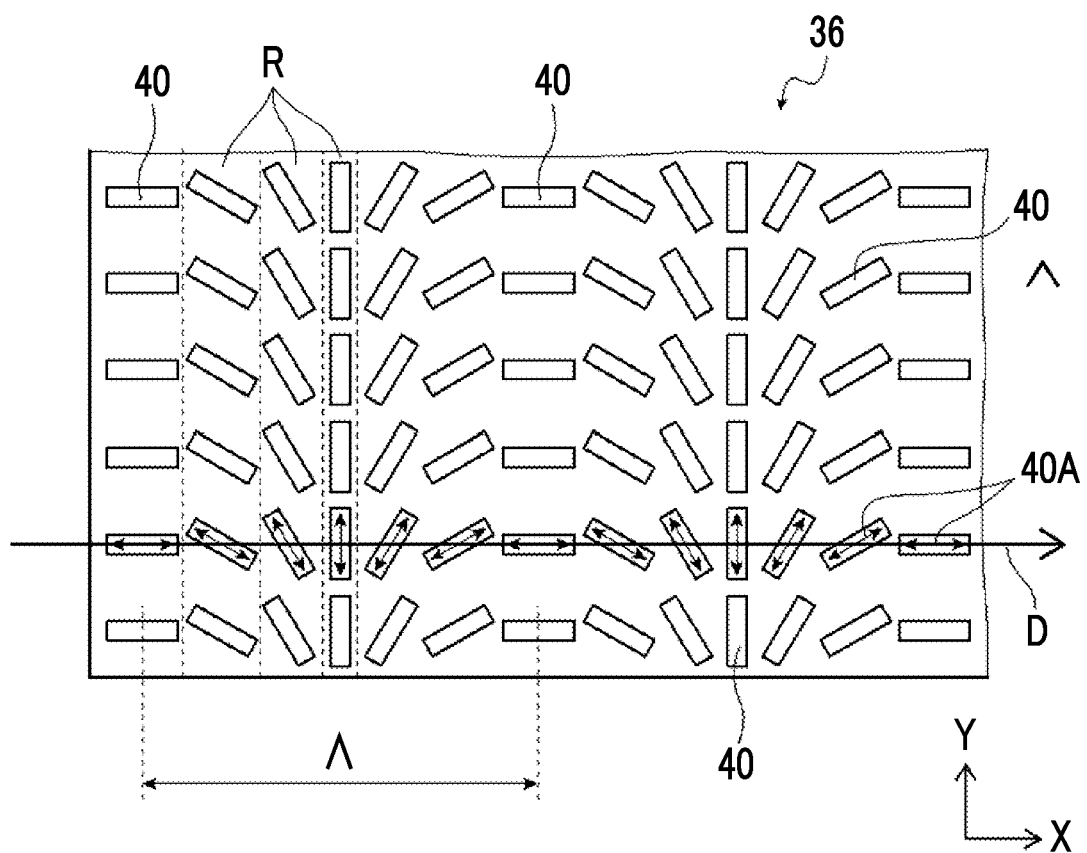
FIG. 10 is a plan view conceptually showing the liquid crystal layer of the diffraction element shown in FIG. 9.

FIGS. 9 and 10 show an example of another liquid crystal diffraction element.

A liquid crystal diffraction element shown in FIGS. 9 and 10 includes the support 30, the alignment film 32, and a liquid crystal layer 36. As the support 30 and the alignment film 32, those described above can be used.

As in the (cholesteric) liquid crystal layer 34, the liquid crystal layer 36 of the liquid crystal diffraction element shown in FIG. 10 also has the liquid crystal alignment pattern in which the optical axis 40A of the liquid crystal compound 40 continuously rotates along the arrangement axis D. FIG. 10 also shows only the liquid crystal compound of the surface of the alignment film 32 as in FIG. 3.

In the liquid crystal diffraction element shown in FIG. 9, the liquid crystal compound 40 forming the liquid crystal layer 36 is not helically twisted and does not rotate in the thickness direction, and the optical axis 40A is positioned at the same position in the plane direction. The liquid crystal layer can be formed by adding a chiral agent to a liquid crystal composition during the formation of the liquid crystal layer.

As described above, the liquid crystal layer 36 has the liquid crystal alignment pattern in which the direction of the optical axis 40A derived from the liquid crystal compound 40 changes while continuously rotating in the arrangement axis D direction in a plane, that is, in the X direction.

On the other hand, regarding the liquid crystal compound 40 forming the liquid crystal layer 36, the liquid crystal compounds 40 having the same direction of the optical axes 40A are arranged at regular intervals in the Y direction perpendicular to the X direction, that is, the Y direction perpendicular to the arrangement axis D as the one in-plane direction in which the optical axis 40A continuously rotates.

In other words, regarding the liquid crystal compound 40 forming the liquid crystal layer 36, in the liquid crystal compounds 40 arranged in the Y direction, angles between the directions of the optical axes 40A and the arrangement axis D direction are the same.

In the liquid crystal compounds arranged in the Y direction in the liquid crystal layer 36, the angles between the optical axes 40A and the X direction (the one in-plane direction in which the direction of the optical axis of the liquid crystal compound 40 rotates) are the same. Regions where the liquid crystal compounds 40 in which the angles between the optical axes 40A and the arrangement axis D are the same are disposed in the Y direction will be referred to as "regions R".

In this case, it is preferable that an in-plane retardation (Re) value of each of the regions R is a half wavelength, that is, $\lambda/2$. The in-plane retardation is calculated from the product of a difference $\Delta n$ in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference $\Delta n$ in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference $\Delta n$ in refractive index is the same as the difference in refractive index of the liquid crystal compound 40.

In a case where circularly polarized light is incident into the above-described liquid crystal layer 36, the light is refracted such that the direction of the circularly polarized light is converted.

Figure 11:
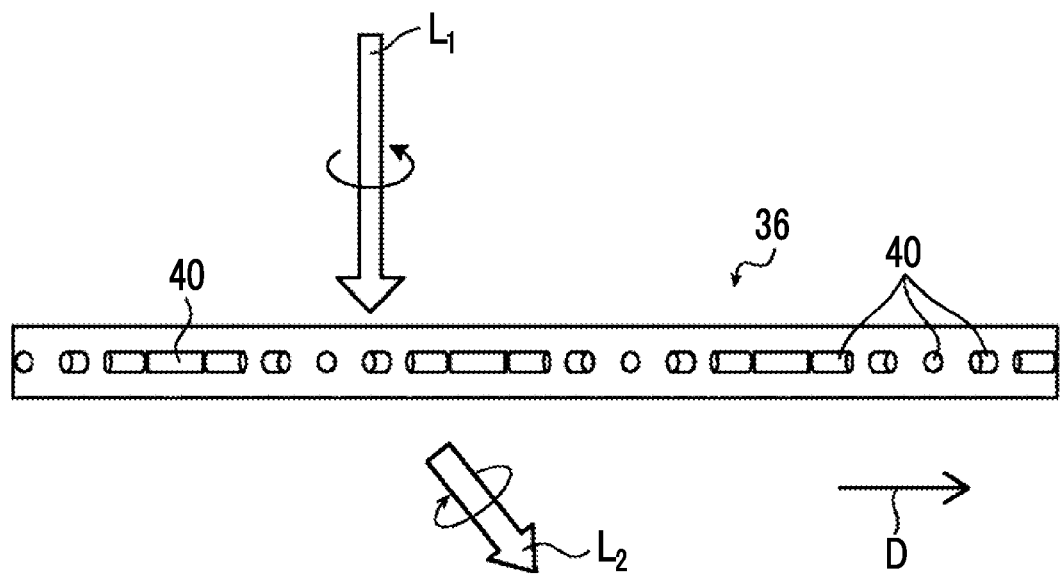
FIG. 11 is a conceptual diagram showing an action of the liquid crystal layer shown in FIG. 9.
Figure 12:
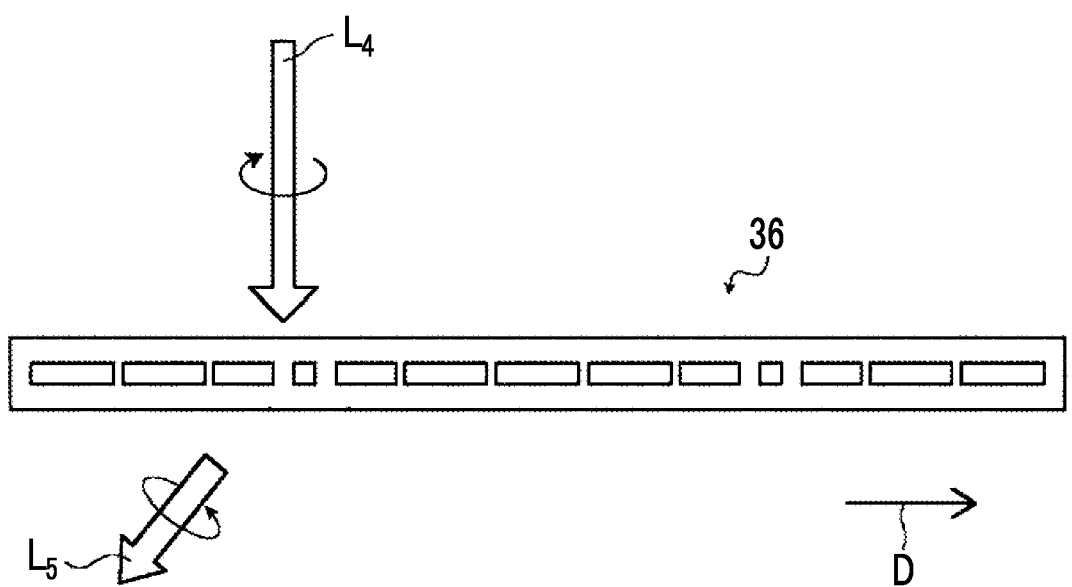
FIG. 12 is a conceptual diagram showing an action of the liquid crystal layer shown in FIG. 9.

This action is conceptually shown in FIGS. 11 and 12. In the liquid crystal layer 36, the value of the product of the difference in refractive index of the liquid crystal compound and the thickness of the optically-anisotropic layer is $\lambda/2$.

As shown in FIG. 11, in a case where the value of the product of the difference in refractive index of the liquid crystal compound in the liquid crystal layer 36 and the thickness of the optically-anisotropic layer is $\lambda/2$ and incidence light $L_1$ as left circularly polarized light is incident into the liquid crystal layer 36, the incidence light $L_1$ transmits through the liquid crystal layer 36 to be imparted with a phase difference of 180°, and the transmitted light $L_2$ is converted into right circularly polarized light.

In addition, the liquid crystal alignment pattern formed in the liquid crystal layer 36 is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction.

On the other hand, as shown in FIG. 12, in a case where the value of the product of the difference in refractive index of the liquid crystal compound in the liquid crystal layer 36 and the thickness of the optically-anisotropic layer is $\lambda/2$ and incidence light $L_4$ of right circularly polarized light is incident into the liquid crystal layer 36, the incidence light $L_4$ transmits through the liquid crystal layer 36 to be imparted with a phase difference of 180°, and the transmitted light $L_4$ is converted into transmitted light $L_5$ of left circularly polarized light.

In addition, the liquid crystal alignment pattern formed in the liquid crystal layer 36 is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrangement axis D direction with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction.

As in the liquid crystal layer 34, by changing the single period Λ of the liquid crystal alignment pattern formed in the liquid crystal layer 36, refraction angles of the transmitted light components $L_2$ and $L_5$ can be adjusted. Specifically, even in the liquid crystal layer 36, as the single period Λ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrangement axis D direction, the refraction direction of transmitted light can be reversed. That is, in the example FIGS. 9 to 12, the rotation direction of the optical axis 40A toward the arrangement axis D direction is clockwise. By setting this rotation direction to be counterclockwise, the refraction direction of transmitted light can be reversed.

From the viewpoint of diffraction efficiency, even in a case where the liquid crystal diffraction element that allows transmission of incidence light and diffracts incidence light is used, it is preferable to use a liquid crystal diffraction element having a region where the liquid crystal compound is twisted and rotates (the twisted angle is less than 360°). In particular, in a case where light is diffracted at an angle where total reflection occurs in the light guide plate, from the viewpoint of diffraction efficiency, a liquid crystal diffraction element including a region in which a liquid crystal compound is twisted and rotates can be suitably used. In addition, from the viewpoint of diffraction efficiency, it is preferable to use a laminate in which liquid crystal diffraction elements having different angles at which the liquid crystal compound is twisted and rotates is laminated, or it is preferable to use a laminate in which liquid crystal diffraction elements having different directions in which the liquid crystal compound is twisted and rotates are laminated.

In the present invention, in the incidence diffraction unit 14 and the emission diffraction unit 16, different liquid crystal diffraction elements may be used.

For example, a transmissive liquid crystal diffraction element including the liquid crystal layer 36 may be used in the incidence diffraction unit 14, and a reflective liquid crystal diffraction element including the liquid crystal layer 34 may be used in the emission diffraction unit 16.

The diffraction element used in the incidence diffraction unit 14 and the emission diffraction unit 16 is not limited to the above-described liquid crystal diffraction element having the liquid crystal alignment pattern.

As the diffraction element, for example, a volume hologram type diffraction element may be used. In addition, a reflective diffraction element that reflect linearly polarized light having wavelength selectivity and where a liquid crystal portion and a liquid crystal polymer portion are alternately provided can also be used.

In the optical member 10 in the example shown in the drawing, the R emission diffraction element 16R, the G emission diffraction element 16G, and the B emission diffraction element 16B forming the emission diffraction unit 16 are laminated, but the present invention is not limited thereto.

That is, in the present invention, regarding the arrangement position of the diffraction elements, various configurations can be used as long as the first emission diffraction element, the second emission diffraction element, the wavelength selective retardation layer 26, and the polarizer 24 are disposed to overlap each other in the main surface of the light guide plate 12. For example, the R emission diffraction element 16R, the G emission diffraction element 16G, and the B emission diffraction element 16B may be disposed at different positions in the main surface of the light guide plate 12. Alternatively, a laminate in which the R emission diffraction element 16R and the B emission diffraction element 16B are laminated and the G emission diffraction element 16G may be disposed at different positions in the main surface of the light guide plate 12.

However, in consideration of the size of the optical member 10 and the like, it is preferable that the R emission diffraction element 16R, the G emission diffraction element 16G, and the B emission diffraction element 16B are laminated and provided.

The incidence diffraction unit 14 of the optical member 10 in the example shown in the drawing has the configuration in which the R incidence diffraction element 14R, the G incidence diffraction element 14G, and the B incidence diffraction element 14B are laminated. However, the present invention is not limited to this configuration.

For example, the R incidence diffraction element 14R, the G incidence diffraction element 14G, and the B incidence diffraction element 14B may be disposed at different positions in the main surface of the light guide plate 12. Alternatively, a laminate in which the R incidence diffraction element 14R and the B incidence diffraction element 14B are laminated and the G incidence diffraction element 14G may be disposed at different positions in the main surface of the light guide plate 12.

From the viewpoint of, for example, reducing the size of the optical member 10, it is advantageous that the R incidence diffraction element 14R, the G incidence diffraction element 14G, and the B incidence diffraction element 14B are laminated. On the other hand, from the viewpoint of preventing inappropriate reflection such as reflection of an image from an unintended diffraction element on the image incidence side, it is advantageous in terms of image quality that the R incidence diffraction element 14R, the G incidence diffraction element 14G, and the B incidence diffraction element 14B are disposed at different positions in the main surface of the light guide plate 12.

Retardation Layer

As described above, in the optical member 10, the images that are diffracted and reflected by the R emission diffraction element 16R, the G emission diffraction element 16G, and the B emission diffraction element 16B of the emission diffraction unit 16, respectively, transmit through the light guide plate 12 to be incident into the retardation layer 18.

It is preferable that the retardation layer 18 is a λ/4 plate (¼ wave plate). As described above, the diffraction elements forming the emission diffraction unit 16 are reflective type polarization diffraction elements including a cholesteric liquid crystal layer (liquid crystal layer 34), and reflect circularly polarized light. Accordingly, the red image R, the green image G, and the blue image B emitted from the light guide plate 12 transmit through the retardation layer 18 to be converted into linearly polarized light.

As the retardation layer 18, a well-known retardation layer can be used. For example, various well-known retardation plates, for example, a cured layer or a structural birefringent layer of a polymer or a liquid crystal compound can be used.

As the retardation layer 18, a retardation layer in which a plurality of retardation plates are laminated to effectively exhibit a desired action is also preferable. As a λ/4 plate, a retardation layer in which a plurality of retardation plates are laminated to effectively function as a λ/4 plate is also preferably used. For example, a broadband λ/4 plate described in WO2013/137464A in which a λ/2 plate and a λ/4 plate are used in combination can handle with incidence light in a wide wavelength range and can be preferably used.

Further, it is preferable that the retardation layer 18 has reverse wavelength dispersibility. In a case where the retardation layer 18 has reverse wavelength dispersibility, incidence light in a wide wavelength range can be handled.

Wavelength Selective Retardation Layer

The red image R, the green image G, and the blue image B converted into linearly polarized light by the retardation layer 18 (λ/4 plate) are incident into the wavelength selective retardation layer 20.

The wavelength selective retardation layer 20 functions as a retardation layer with respect to polarized light having a specific wavelength range. In the optical member 10 in the example shown in the drawing, the wavelength selective retardation layer functions as a λ/2 plate (λ/2 retardation layer) that selectively acts on green light, and allows transmission the other light without acting on the other light.

Accordingly, in the optical member 10 in the example shown in the drawing, the wavelength selective retardation layer 20 turns the polarization direction of only the green light, that is, the green image G that is reflected by the G emission diffraction element 16G as the second emission diffraction element is converted into linearly polarized light by the retardation layer 18 by 90°, and allows transmission (passage) of the red image R and the blue image B while maintaining the polarized state thereof.

In other words, the wavelength selective retardation layer 20 shifts only a phase in a specific wavelength range by π. The wavelength selective retardation layer 20 will also be referred to as, for example, a λ/2 plate that acts only in a specific wavelength range.

This wavelength selective retardation layer 20 can be prepared, for example, by laminating a plurality of phase difference plates having different phase differences.

As the wavelength selective retardation layer, for example, a wavelength selective retardation layer described in JP2000-510961A, SID 99 DIGEST, pp. 1072-1075, or the like can be used.

In the wavelength selective retardation layer, a plurality of retardation plates (retardation layers) having different slow axis angles (slow axis directions) are laminated such that linearly polarized light in a specific wavelength range into linearly polarized light having an opposite turning direction. The plurality of retardation plates are not limited to the configuration in which all the slow axis angles are different from each other. For example, a slow axis angle of at least one retardation plate may be different from that of another retardation plate.

It is preferable that at least one retardation plate has forward dispersibility. In a case where at least one retardation plate has forward dispersibility, by laminating a plurality of retardation plates at different slow axis angles, a λ/2 plate that acts only in a specific wavelength range can be realized.

On the other hand, the wavelength selective retardation layer described in JP2000-510961A, SID 99 DIGEST, pp. 1072-1075, or the like can selectively convert linearly polarized light into linearly polarized light having an opposite turning direction.

Polarizer

The wavelength selective retardation layer 20 causes the red image R, the green image G, and the blue image B that are transmitted to be incident into the polarizer 24.

In a preferable example, the polarizer 24 is an absorption type linear polarizer, and a transmission axis thereof matches the directions of linearly polarized light of the red image R and the blue image B that are converted by the retardation layer 18.

Accordingly, the direction of the slow axis of the retardation layer 18 (λ/4 plate) and the direction of the transmission axis of the polarizer 24 are set such that the transmission of the linearly polarized light of the red image R and the blue image B converted by the retardation layer 18 is allowed.

The polarizer 24 is not particularly limited, and various well-known polarizers can be used. Accordingly, as the polarizer 24, any of an iodine polarizer, a dye-based polarizer using a dichroic dye, a polyene polarizer, or a polarizer formed of a material that polarizes light by UV absorption may be used.

The iodine polarizer and the dye-based polarizer are generally manufactured using a polyvinyl alcohol film. The details of a method of manufacturing the polarizer can be found in, for example, JP2011-128584A. Alternatively, a polarizer obtained by mixing a liquid crystal compound with a dichroic dye and aligning the mixture can also be used. In addition, for example, a polarizer obtained by aligning a dichroic dye having liquid crystallinity, a polarizer obtained by mixing a dichroic dye having liquid crystallinity and a dichroic dye having no liquid crystallinity with each other and aligning the mixture, or a polarizer obtained by mixing both of the mixtures with another liquid crystal compound and aligning the mixture may also be used. As the polarizer, a polarizer in which the alignment state is immobilized by heat or light may also be used. In addition, these polarizers may be a layer formed by application.

As the polarizer formed of a material that polarizes light by UV absorption, a material of which the polarization degree and the concentration increase at the same time by UV absorption may be used. By using the polarizer formed of a material that polarizes light by UV absorption, the polarizer does not exhibit the polarization capability during UV non-irradiation to be in a light-transmitting display state in a normal situation. On the other hand, in a case where the laminate according to the embodiment of the present invention absorbs UV during UV irradiation, a laminate can also be prepared in which the polarizer formed of a material that polarizes light by UV absorption exhibits the polarization capability such that the laminate can be switched to a light-shielding display state. Examples of the polarizer formed of a material that polarizes light by UV absorption include TRANSITIONS and a polarizing lens manufactured by Nihon Optical Co., Ltd.

Action of Optical Member

As described above, in the optical member 10, the red image R, the green image G, and the blue image B projected from a display element (not shown) transmits through the light guide plate 12 and are incident into the incidence diffraction unit 14. The red image R is diffracted and reflected by the R incidence diffraction element 14R as right circularly polarized light, the green image G is diffracted and reflected by the G incidence diffraction element 14G as right circularly polarized light, and the blue image B is diffracted and reflected by the B incidence diffraction element 14B as right circularly polarized light. These light components are incident into the light guide plate 12.

The red image R, the green image G, and the blue image B incident into the light guide plate 12 propagate in the light guide plate 12 while being repeatedly totally reflected, and is emitted to the emission diffraction unit 16. While repeatedly being totally reflected by the light guide plate 12, the circularly polarized light components of the respective color images collapse to enter a state where various polarized states such as elliptically polarized light are mixed.

Among the respective color images incident into the emission diffraction unit 16, The red image R is diffracted and reflected by the R emission diffraction element 16R as right circularly polarized light, the green image G is diffracted and reflected by the G emission diffraction element 16G as left circularly polarized light, and the blue image B is diffracted and reflected by the B emission diffraction element 16B as right circularly polarized light. These light components transmit through the light guide plate 12.

Here, as described above, in the optical member in which diffraction elements are laminated and diffract the red image R, the green image G, and the blue image B to project the images, each of the images may be diffracted by an unintended diffraction element such that multiple images may occur.

That is, in an optical member used for AR glasses or the like, in a case where color images consisting of the red image R, the green image G, and the blue image B are emitted from a display element, are diffracted to be incident into the light guide plate 12, propagate in the light guide plate 12, are diffracted by the R emission diffraction element 16R, the G emission diffraction element 16G, and the B emission diffraction element 16B that are laminated, and are emitted, an image may be diffracted and reflected by an unintended diffraction element.

Figure 15:
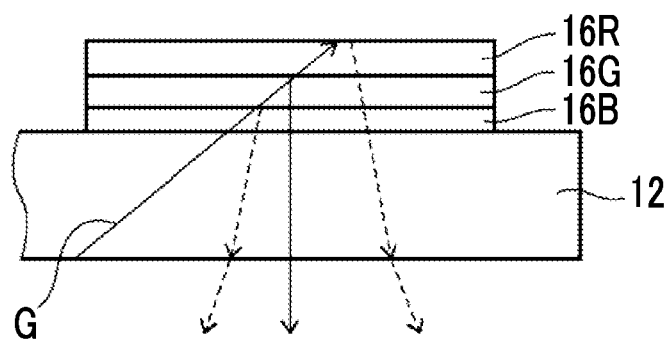
FIG. 15 is a conceptual diagram showing the occurrence of multiple images.

For example, as conceptually shown in FIG. 15, the green image G is reflected by the G emission diffraction element 16G for originally reflecting the green image G, and a part thereof is also reflected by the R emission diffraction element 16R for reflecting the red image R and/or the B emission diffraction element 16B for reflecting the blue image B (broken line).

In this case, as described above, in the R emission diffraction element 16R, the G emission diffraction element 16G, and the B emission diffraction element 16B, the single periods Λ (the periods of the diffraction structures) are different from each other depending on the wavelength ranges of the images to be diffracted. Therefore, the green image G that is appropriately reflected by the G emission diffraction element 16G, the green image G that is reflected by the R emission diffraction element 16R, and the green image G that is reflected by the B emission diffraction element 16B are reflected at different angles. As a result, multiple images occur and are visually recognized by the user.

The multiple images are likely to occur in a case where the wavelengths of diffracted light components that are selectively reflected (diffracted) by the diffraction elements are close to each other. That is, in the example shown in the drawing, multiple images occur between the green image G and the red image R, and multiple images occur between the green image G and the blue image B.

On the other hand, the optical member 10 according to the embodiment of the present invention includes the wavelength selective retardation layer 20 and the polarizer 24 and preferably further includes the retardation layer 18 such that multiple images can be suppressed.

Hereinafter, the description will be made with reference to the conceptual diagram of FIG. 13.

As described above, the R emission diffraction element 16R and the B emission diffraction element 16B as the first emission diffraction elements and the B emission diffraction element 16B as the second emission diffraction element reflect (diffract) polarized light components having opposite properties.

Specifically, the R emission diffraction element 16R selectively reflects right circularly polarized light, the G emission diffraction element 16G selectively reflects left circularly polarized light, and the B emission diffraction element 16B selectively reflects right circularly polarized light. Accordingly, the appropriate red image R reflected by the R emission diffraction element 16R and the appropriate blue image B reflected by the B emission diffraction element 16B are right circularly polarized light as shown on the left side of FIG. 13. In addition, the appropriate green image G reflected by the G emission diffraction element 16G is left circularly polarized light as shown on the left side of FIG. 13.

The retardation layer 18 is a λ/4 plate. Accordingly, the red image R and the blue image B and the green image G transmitted through the retardation layer 18 are linearly polarized light components having direction perpendicular to each other. In the example shown in the drawing, the red image R and the blue image B are linearly polarized light having a direction perpendicular to the paper plane, and the green image G is linearly polarized light having a direction parallel to the paper plane.

The respective color images converted into linearly polarized light are incident into the wavelength selective retardation layer 20.

As described above, the wavelength selective retardation layer 20 acts as a λ/2 plate for only the green light and allows transmission of light in other wavelength ranges without affecting the light.

Accordingly, the red image R and the blue image B transmit through the wavelength selective retardation layer 20 while being the linearly polarized light having a direction perpendicular to the paper plane. On the other hand, the polarization direction of the green image G as the green light is rotated by 90° by the wavelength selective retardation layer, and the green image G is converted into linearly polarized light having a direction perpendicular to the paper plane as in the red image R and the blue image B.

As a result, all of the appropriate color images are linearly polarized light perpendicular to the paper plane.

In the example shown in the drawing, an absorption axis a of the polarizer 24 is a direction parallel to the paper plane.

Accordingly, the appropriate images, that is, all of the red image R reflected by the R emission diffraction element 16R, the blue image B reflected by the B emission diffraction element 16B, and the green image G reflected by the G emission diffraction element 16G transmit through the polarizer 24 and are emitted to the observation position by the user U.

On the other hand, as described above, the images as multiple images are reflected by diffraction elements that should not be reflected (diffracted).

Figure 13:
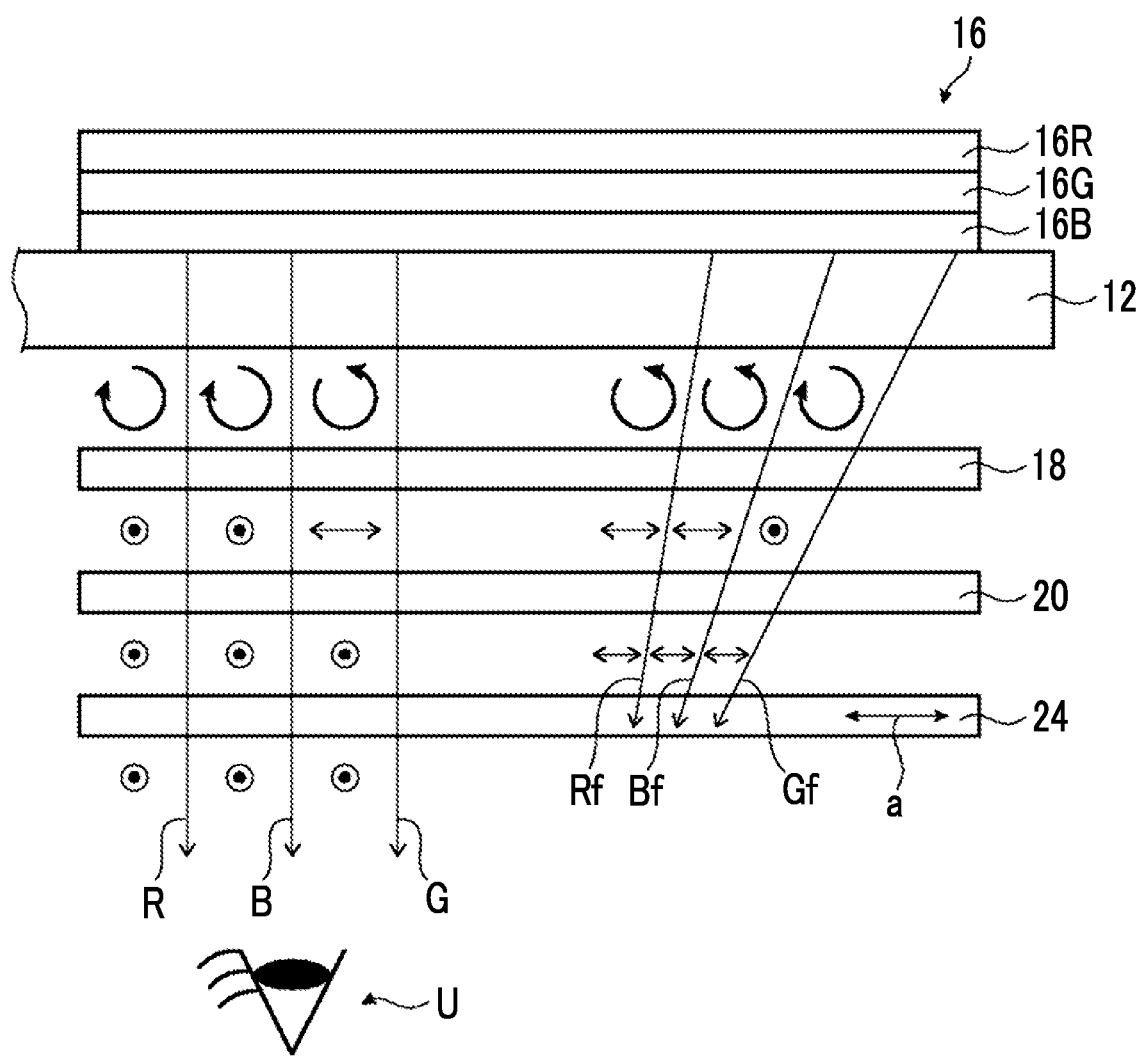
FIG. 13 is a conceptual diagram showing an action of the optical member according to the present invention.

That is, as shown on the right side of FIG. 13, a red image Rf and a blue image Bf as multiple images are reflected by the G emission diffraction element 16G as left circularly polarized light. In addition, a green image Gf as multiple images is reflected by the R emission diffraction element 16R and the B emission diffraction element 16B as right circularly polarized light.

The wavelengths of the red image R and the blue image B are distant from each other. Therefore, the amount of reflection of the blue image Bf by the R emission diffraction element 16R and the amount of reflection of the red image Rf by the B emission diffraction element 16B are negligible.

Next, the respective color images as multiple images are converted by the retardation layer as a λ/4 plate.

Here, the turning direction of circularly polarized light of the images as multiple images is opposite to that of the appropriate images. As shown on the right side of FIG. 13, the red image Rf and the blue image Bf are linearly polarized light parallel to the paper plane, and the green image Gf is linearly polarized light perpendicular to the paper plane.

The respective color images as multiple images converted into linearly polarized light are incident into the wavelength selective retardation layer 20. As described above, the wavelength selective retardation layer 20 acts as a λ/2 plate for only the green light. Accordingly, the red image Rf and the blue image Bf as multiple images transmit through the wavelength selective retardation layer 20 while being the linearly polarized light parallel to the paper plane. On the other hand, the polarization direction of the green image Gf as multiple images is rotated by 90° by the wavelength selective retardation layer 20, and the green image G is converted into linearly polarized light parallel to the paper plane as in the red image Rf and the blue image Bf.

As a result, all of the color images as multiple images are linearly polarized light parallel to the paper plane of FIG. 13.

As described above, the absorption axis a of the polarizer 24 is a direction parallel to the paper plane in FIG. 13.

Accordingly, all of the images as multiple images, that is, the green image Gf reflected by the R emission diffraction element 16R and the B emission diffraction element 16B and the red image Rf and the blue image Bf reflected by the G emission diffraction element 16G are shielded by the polarizer 24 and are not emitted to the observation position by the user U.

That is, in a case where the optical member 10 according to the embodiment of the present invention is used, for example, as AR glasses, the appropriate images diffracted by the appropriate diffraction elements are emitted to the observation position by the user U and are observed by the user. On the other hand, the images as multiple images diffracted by unintended inappropriate diffraction elements are not emitted to the observation position by the user U. Therefore, multiple images are not observed by the user U.

In the optical member 10 in the example shown in the drawing, in a case where the appropriate images (circularly polarized light) reflected by the appropriate emission diffraction elements are converted into linearly polarized light by the retardation layer 18, the direction of the slow axis of the retardation layer 18 and the direction of the absorption axis of the polarizer 24 are set such that the linearly polarized light transmits through the polarizer 24.

However, the present invention is not limited to this configuration. The direction of the slow axis of the retardation layer 18 and the direction of the absorption axis of the polarizer 24 may be set such that the appropriate images reflected by the appropriate emission diffraction elements are converted into linearly polarized light by the retardation layer 18, the linearly polarized light is rotated by 90° by the wavelength selective retardation layer 20, and the linearly polarized light transmits through the polarizer 24.

In the optical member 10 shown in FIGS. 1 and 13, in a preferable aspect, the retardation layer 18 is provided between the wavelength selective retardation layer 20 and the light guide plate 12. However, the present invention is not limited to this configuration, and the retardation layer 18 does not need to be provided.

However, in a case where the retardation layer 18 is not provided, circularly polarized light is incident into the polarizer 24. Therefore, the effect of the polarizer 24 shielding the images as multiple images is reduced. Accordingly, from the viewpoint of more suitably preventing multiple images from being visually recognized, it is preferable that the optical member 10 includes the retardation layer 18.

In a case where the diffracted light of the emission diffraction elements in the emission diffraction unit 16 is linearly polarized light, the retardation layer 18 is unnecessary.

In addition, in a case where the diffracted light of the emission diffraction elements in the emission diffraction unit 16 is not circularly polarized light and linearly polarized light, the phase difference of the retardation layer 18 is appropriately set such that images as multiple images can be suppressed.

In addition, in the optical member 10 shown in FIGS. 1 and 13, in a preferable aspect, the retardation layer 18 and the light guide plate 12 are spaced from each other.

In the optical member 10 according to the embodiment of the present invention, the wavelength selective retardation layer 20 is provided between the polarizer 24 and the light guide plate 12 (light guide element), and in a preferable aspect, the retardation layer 18 is provided between the wavelength selective retardation layer 20 and the light guide plate 12. In the optical member according to the embodiment of the present invention, it is preferable that the light guide plate 12 and the retardation layer 18 are spaced from each other. In addition, in a case where the light guide plate 12 and the retardation layer 18 are laminated, it is preferable that the retardation layer 18 and the wavelength selective retardation layer 20 are spaced from each other. In a case where the light guide plate 12, the retardation layer 18, and the wavelength selective retardation layer 20 are laminated, it is preferable that the wavelength selective retardation layer 20 and the polarizer 24 are spaced from each other.

In addition, in a case where the retardation layer 18 is not provided, it is preferable that the light guide plate 12 and the wavelength selective retardation layer 20 are spaced from each other. In a case where the light guide plate 12 and the wavelength selective retardation layer 20 are laminated, it is preferable that the wavelength selective retardation layer 20 and the polarizer 24 are spaced from each other.

That is, in the optical member according to the embodiment of the present invention, it is preferable that a member laminated on the light guide plate 12 and the polarizer 24 are spaced from each other.

In a case where a member laminated on the light guide plate 12 and the polarizer 24 are laminated, an image (light) that propagates in the light guide plate 12 arrives at and is absorbed by the polarizer 24. As a result, in a case where a member in contact with the light guide plate 12 is in contact with the polarizer 24, the amount of the image emitted to the observation position by the user U decreases.

On the other hand, in a case where a member in contact with the light guide plate 12 is spaced from the polarizer 24, the image that propagates in the light guide plate 12 can be prevented from arriving at the polarizer 24. Therefore, a decrease in the amount of the image emitted to the observation position by the user U caused by the polarizer 24 can be prevented.

Figure 14:
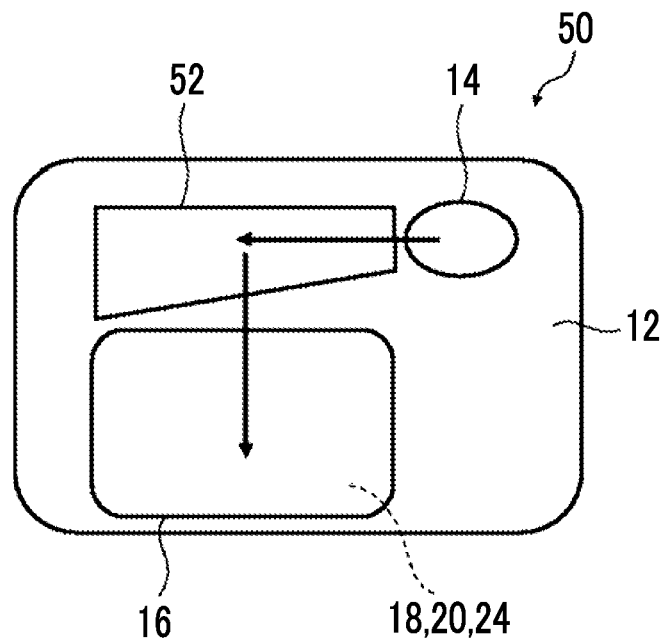
FIG. 14 is a diagram conceptually showing another example of optical member according to the present invention.

FIG. 14 conceptually shows another example of the optical member according to the embodiment of the present invention.

FIG. 14 is a diagram in a case where the optical member is seen from a direction perpendicular to the main surface of the light guide plate. That is, FIG. 14 is a diagram in a case where the optical member is seen from the top of FIG. 1.

The optical member 10 shown in FIG. 1 includes: the incidence diffraction unit 14 that includes the R incidence diffraction element 14R and the B incidence diffraction element 14B as the first incidence diffraction elements and the G incidence diffraction element 14G as the second incidence diffraction element; and the emission diffraction unit 16 that includes the R emission diffraction element 16R and the B emission diffraction element 16B as the first emission diffraction elements and the G emission diffraction element 16G as the second emission diffraction element.

On the other hand, in addition to the incidence diffraction unit 14 and the emission diffraction unit 16, an optical member 50 shown in FIG. 14 includes an intermediate diffraction unit 52 in which a R intermediate diffraction element and a B intermediate diffraction element as the first intermediate diffraction elements and a G intermediate diffraction element as the second intermediate diffraction element are laminated.

The R intermediate diffraction element is the same as the R incidence diffraction element 14R except that the single periods Λ are different, and is a diffraction element that selectively reflects right circularly polarized light of red light. The G intermediate diffraction element is the same as the G incidence diffraction element 14G except that the single periods Λ are different, and is a diffraction element that selectively reflects right circularly polarized light of green light. The B intermediate diffraction element is the same as the B incidence diffraction element 14B except that the single periods Λ are different, and is a diffraction element that selectively reflects right circularly polarized light of blue light.

Circularly polarized light components that are selectively reflected by the R intermediate diffraction element, the G intermediate diffraction element, and the B intermediate diffraction element may be the same as or different from each other and, for example, may be the same as those of the emission diffraction element.

In addition, as in the optical member 10, even in the optical member 50, the retardation layer 18, the wavelength selective retardation layer 20, and the polarizer 24 are provided to overlap the emission diffraction unit 16 in the main surface of the light guide plate 12 on a surface of the light guide plate 12 opposite to the emission diffraction unit 16 or the like.

In the optical member 50, as shown in FIG. 14, the respective color images incident into the incidence diffraction unit 14 are reflected (diffracted) to the intermediate diffraction unit 52 to be incident into the light guide plate 12 by the R incidence diffraction element 14R, the G incidence diffraction element 14G, and the B incidence diffraction element 14B of the incidence diffraction unit 14.

The respective color images incident into the light guide plate 12 are totally reflected in the light guide plate 12, propagate from the incidence diffraction unit 14 to the intermediate diffraction unit 52, and are reflected (diffracted) to the emission diffraction unit 16 by the R intermediate diffraction element, the G intermediate diffraction element, and the B intermediate diffraction element of the intermediate diffraction unit 52.

The respective color images diffracted by the intermediate diffraction unit 52 are totally reflected in the light guide plate 12, propagate from the intermediate diffraction unit 52 to the emission diffraction unit 16, are incident into the emission diffraction unit 16, are reflected (diffracted) by the R emission diffraction element 16R, the G emission diffraction element 16G, and the B emission diffraction element 16B, and are emitted from the light guide plate 12.

Here, in the emission diffraction unit 16, the appropriate images diffracted by the corresponding emission diffraction elements are emitted from the light guide plate 12, transmit through the retardation layer 18, the wavelength selective retardation layer 20, and the polarizer 24 as described above, and are emitted to the observation position by the user U.

On the other hand, in the emission diffraction unit 16, images as multiple images diffracted by unintended emission diffraction elements are shielded by the polarizer 24 as described above, and are not emitted to the observation position by the user U such that multiple images are not observed by the user U.

By providing the intermediate diffraction unit 52, the field of view (FOV) can be widened in AR glasses including the optical member according to the embodiment of the present invention.

Even in the intermediate diffraction unit 52, it is preferable that a permutation of the wavelengths of light to be selectively reflected (diffracted) and a permutation of the single periods Λ of the liquid crystal alignment patterns of the diffraction elements match each other. That is, in a case where the single period Λ of the liquid crystal alignment pattern of the R intermediate diffraction element is represented by ΛmidR, the single period Λ of the liquid crystal alignment pattern of the G intermediate diffraction element is represented by ΛmidG, and the single period Λ of the liquid crystal alignment pattern of the B intermediate diffraction element is represented by ΛmidB, it is preferable that "ΛmidR>ΛmidG>ΛmidB" is satisfied.

As the first intermediate diffraction element and the second intermediate diffraction element forming the intermediate diffraction unit 52, various well-known diffraction elements can be used.

In addition, for the optical member including the intermediate diffraction unit (intermediate diffraction elements), various well-known configurations such as a configuration disclosed in JP2006-546020A can be used.

Hereinabove, the optical member and the image display apparatus according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Preparation of G Incidence Diffraction Element

Formation of Alignment Film

A glass substrate was used as the support. The following coating liquid for forming an alignment film was applied to the support by spin coating. The support on which the coating film of the coating liquid for forming an alignment film was formed was dried using a hot plate at 60° C. for 60 seconds. As a result, an alignment film was formed.

Coating Liquid for Forming Alignment Film

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

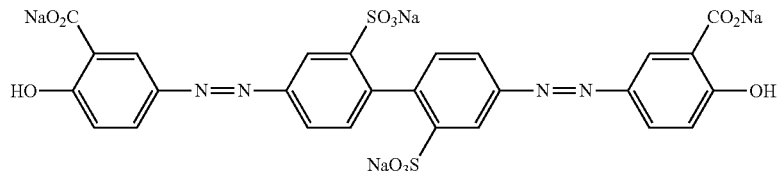

-Material for Photo-Alignment-

Exposure of Alignment Film

The alignment film was exposed using the exposure device shown in FIG. 8 to form an alignment film P-1 having an alignment pattern.

In the exposure device, a laser that emits laser light having a wavelength (325 nm) was used as the laser. The exposure amount of the interference light was 1000 $mJ/cm^2$. The single period (the length over which the optical axis rotates by 180°) of an alignment pattern formed by interference of two laser beams was controlled by changing an intersecting angle (intersecting angle α) between the two beams.

Formation of Liquid Crystal Layer

As the liquid crystal composition forming the liquid crystal layer of the G incidence diffraction element, the following composition A-1 was prepared. This composition A-1 is a liquid crystal composition forming a cholesteric liquid crystal layer (cholesteric liquid crystalline phase) that selectively reflects right circularly polarized light.

Composition A-1

| | |
|---|---|
| Rod-like liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 4.87 parts by mass |
| Methyl ethyl ketone | 204.00 parts by mass |

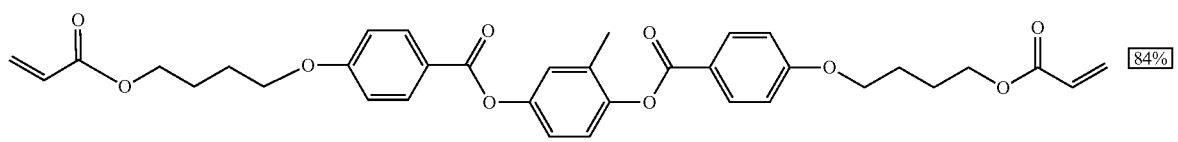

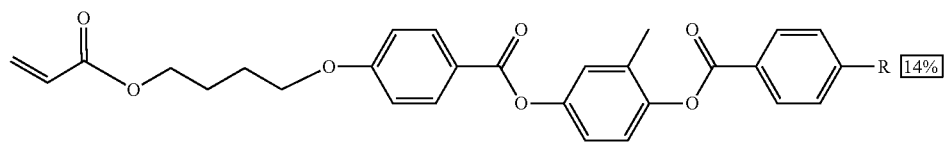

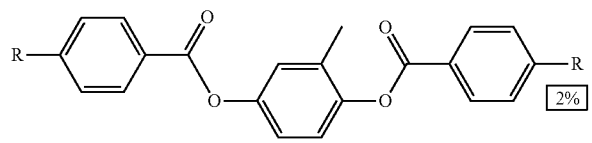

Rod-Like Liquid Crystal Compound L-1

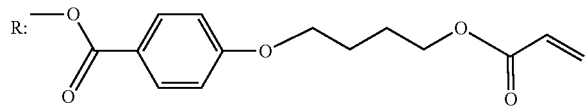

-continued

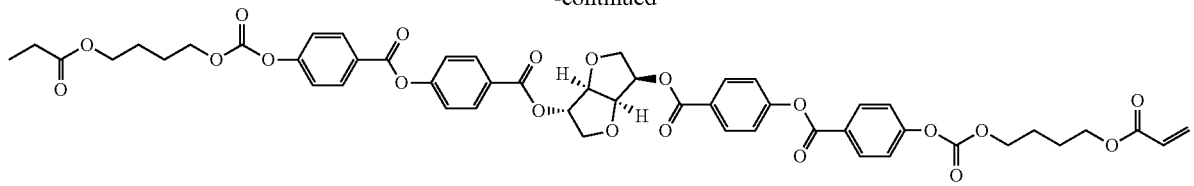

Chiral Agent Ch-1

The above-described composition A-1 was applied to the alignment film P-1 to form a coating film, the coating film was heated using a hot plate at 80° C. and was irradiated at 80° C. with ultraviolet light having a wavelength of 365 nm at an irradiation dose of 300 mJ/cm² using a high-pressure mercury lamp in a nitrogen atmosphere. As a result, the alignment of the liquid crystal compound is immobilized, and the liquid crystal layer (optically-anisotropic layer) of the G incidence diffraction element was formed.

In a case where a cross-section of the coating layer was observed with a SEM, bright portions and dark portions were tilted with respect to a main surface (refer to FIG. 4), and the number of pitches in the normal direction (thickness direction) with respect to the main surface was 8. Regarding the pitch, an interval between bright portions or between dark portions in the normal direction with respect to the main surface was set as a ½ pitch.

In addition, the pitch P of tilted surfaces of bright portions and dark portions with respect to a main surface was 0.36 µm. Regarding the pitch P, an interval between bright portions or between dark portions in the normal direction with respect to the inclined surface was set as a ½ pitch. The bright portions and the dark portions described herein refer to bright portions and dark portions derived from a cholesteric liquid crystalline phase in a case where a cross-section of the cholesteric liquid crystal layer was observed with a SEM.

It was verified using a polarization microscope that the liquid crystal layer of the G incidence diffraction element had a periodically aligned surface as shown in FIG. 3. In a case where a cross-section of the coating layer was observed with a SEM, in the liquid crystal alignment pattern of the liquid crystal layer (first layer) of the G incidence diffraction element, the single period ($\Lambda$inG) over which the optical axis of the liquid crystal compound rotated by 180° was 0.39 µm.

The G incidence diffraction element is the second incidence diffraction element according to the embodiment of the present invention.

Preparation of R Incidence Diffraction Element

A R incidence diffraction element was prepared using the same method as that of the G incidence diffraction element, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 4.12 parts by mass, and the film thickness was adjusted.

In a case where the R incidence diffraction element was measured using the same method as that of G incidence diffraction element, the number of pitches in each of the liquid crystal layers was 8, in the liquid crystal alignment pattern, the single period ($\Lambda$inR) over which the optical axis of the liquid crystal compound rotated by 180° was 0.45 µm, and the pitch P was 0.43 µm.

The R incidence diffraction element is the first incidence diffraction element according to the embodiment of the present invention.

Preparation of B Incidence Diffraction Element

A B incidence diffraction element was prepared using the same method as that of the G incidence diffraction element, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 6.10 parts by mass, and the film thickness was adjusted.

In a case where the R incidence diffraction element was measured using the same method as that of G incidence diffraction element, the number of pitches in each of the liquid crystal layers was 8, in the liquid crystal alignment pattern, the single period ($\Lambda$inB) over which the optical axis of the liquid crystal compound rotated by 180° was 0.32 µm, and the pitch P was 0.31 µm.

The B incidence diffraction element is the first incidence diffraction element according to the embodiment of the present invention.

Preparation of G Emission Diffraction Element

A composition A-2 was prepared using the same method as that of the composition A-1, except that the following chiral agent Ch-2 was used and the addition amount of the chiral agent was changed to 8.20 parts by mass.

This composition A-2 is a liquid crystal composition forming a cholesteric liquid crystal layer (cholesteric liquid crystalline phase) that selectively reflects left circularly polarized light.

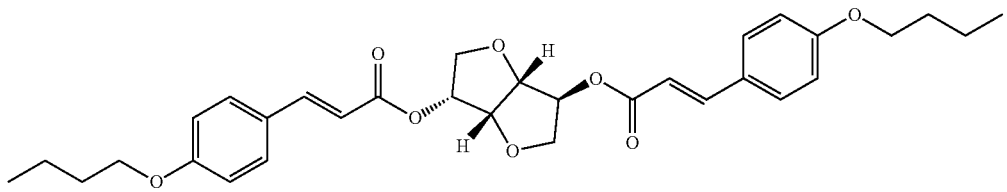

Chiral agent Ch-2

A G emission diffraction element was prepared using the same method as that of the G incidence diffraction element, except that the composition A-2 was used for forming the liquid crystal layer and the thickness of the liquid crystal layer was adjusted by adjusting the application amount.

In a case where the R incidence diffraction element was measured using the same method as that of G incidence diffraction element, the number of pitches in each of the liquid crystal layers was 2, in the liquid crystal alignment pattern, the single period ($\Lambda$outG) over which the optical axis of the liquid crystal compound rotated by 180° was 0.39 μm, and the pitch P was 0.36 μm.

The G emission diffraction element is the second emission diffraction element according to the embodiment of the present invention.

Preparation of R Emission Diffraction Element and G Emission Diffraction Element A R emission diffraction element and a G emission diffraction element were prepared using the same method as that of the R incidence diffraction element and the G incidence diffraction element, except that the thickness of the liquid crystal layer was adjusted by adjusting the application amount of the liquid crystal composition.

In a case where each of the R emission diffraction element and the G emission diffraction element was measured using the same method as that of G incidence diffraction element, the number of pitches of the liquid crystal layer in each of the R emission diffraction element and the G emission diffraction element was 2.

The R emission diffraction element and the B emission diffraction element are the first emission diffraction elements according to the embodiment of the present invention.

Preparation of G Intermediate Diffraction Element

A G intermediate diffraction element was prepared using the same method as that of the G incidence diffraction element, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 4.64 parts by mass, and the thickness of the liquid crystal layer was adjusted by adjusting the application amount of the liquid crystal composition.

In a case where the R incidence diffraction element was measured using the same method as that of G incidence diffraction element, the number of pitches in each of the liquid crystal layers was 2, in the liquid crystal alignment pattern, the single period ($\Lambda$midG) over which the optical axis of the liquid crystal compound rotated by 180° was 0.28 μm, and the pitch P was 0.41 μm.

The G intermediate diffraction element is the second intermediate diffraction element according to the embodiment of the present invention.

Preparation of R Intermediate Diffraction Element

A R intermediate diffraction element was prepared using the same method as that of the R incidence diffraction element, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 3.94 parts by mass, and the thickness of the liquid crystal layer was adjusted by adjusting the application amount of the liquid crystal composition.

In a case where the R incidence diffraction element was measured using the same method as that of G incidence diffraction element, the number of pitches in each of the liquid crystal layers was 2, in the liquid crystal alignment pattern, the single period ($\Lambda$midR) over which the optical axis of the liquid crystal compound rotated by 180° was 0.32 μm, and the pitch P was 0.48 μm.

The R intermediate diffraction element is the first intermediate diffraction element according to the embodiment of the present invention.

Preparation of B Intermediate Diffraction Element

A B intermediate diffraction element was prepared using the same method as that of the B incidence diffraction element, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 5.57 parts by mass, and the thickness of the liquid crystal layer was adjusted by adjusting the application amount of the liquid crystal composition.

In a case where the R incidence diffraction element was measured using the same method as that of G incidence diffraction element, the number of pitches in each of the liquid crystal layers was 2, in the liquid crystal alignment pattern, the single period ($\Lambda$midB) over which the optical axis of the liquid crystal compound rotated by 180° was 0.23 μm, and the pitch P was 0.34 μm.

The B intermediate diffraction element is the first intermediate diffraction element according to the embodiment of the present invention.

Preparation of Retardation Layer (λ/4 Plate)

Formation of Alignment Film

An alignment film was formed using the same method as that of Example 1.

Exposure of Alignment Film

By irradiating the obtained alignment film with polarized ultraviolet light (50 mJ/cm², using an extra high pressure mercury lamp), the alignment film was exposed.

Formation of λ/4 Plate

As the liquid crystal composition forming the λ/4, the following composition C-1 was prepared.

Composition C-1

| | |
|---|---|
| Liquid crystal compound L-2 | 42.00 parts by mass |
| Liquid crystal compound L-3 | 42.00 parts by mass |
| Liquid crystal compound L-4 | 16.00 parts by mass |
| Polymerization initiator PI-1 | 0.50 parts by mass |
| Leveling agent G-1 | 0.20 parts by mass |
| Methyl ethyl ketone | 176.00 parts by mass |
| Cyclopentanone | 44.00 parts by mass |

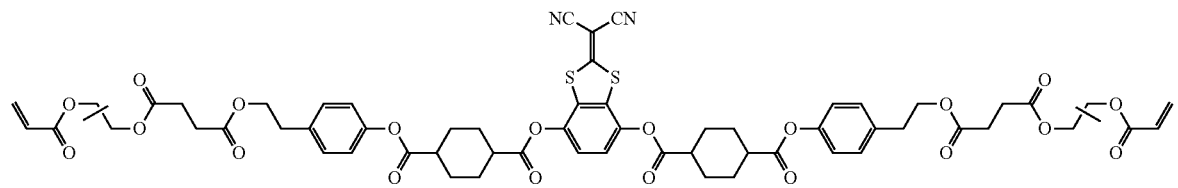

Liquid Crystal Compound L-2
Me Positional Isomer Mixture

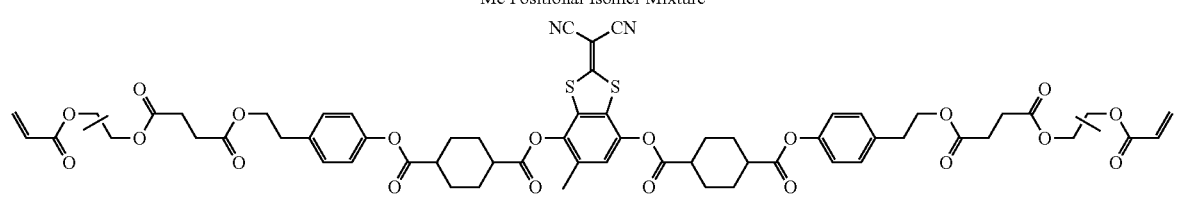

Liquid Crystal Compound L-3
Me Positional Isomer Mixture

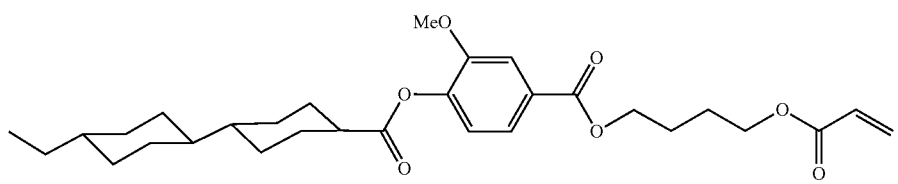

Liquid Crystal Compound L-4

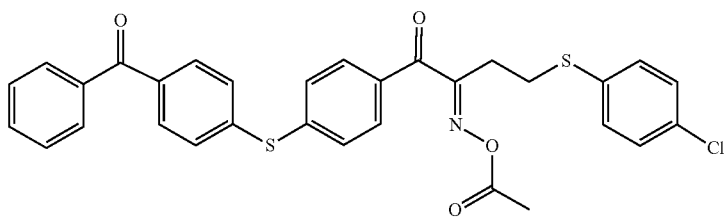

Polymerization initiator PI-1

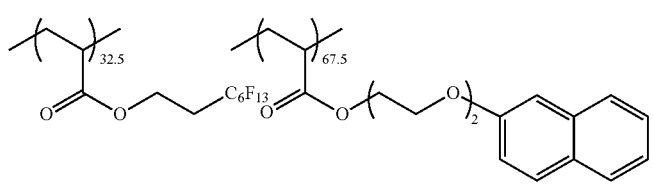

Leveling Agent G-1

As the λ/4 plate, a layer formed of a reverse dispersion liquid crystal compound was formed.

The λ/4 plate was formed by applying the following composition C-1 to the alignment film. The applied coating film was heated using a hot plate at 70° C., the coating film was cooled to 65° C., and the coating film was irradiated with ultraviolet light having a wavelength of 365 nm at an irradiation dose of 500 mJ/cm² using a high-pressure mercury lamp in a nitrogen atmosphere. As a result, the alignment of the liquid crystal compound was immobilized.

As a result, a λ/4 plate was obtained. Re(530) of the obtained λ/4 plate was 133 nm.

Preparation of Wavelength Selective Retardation Layer

Formation of Alignment Film

An alignment film was formed using the same method as that of Example 1.

Exposure of Alignment Film

By irradiating the obtained alignment film with polarized ultraviolet light (50 mJ/cm², using an extra high pressure mercury lamp), the alignment film was exposed.

Preparation of λ Plate at λ=725 nm

As the liquid crystal composition forming the λ, the following composition C-2 was prepared.

Composition C-2

| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent G-1 | 0.20 parts by mass |
| Methyl ethyl ketone | 243.00 parts by mass |

The plate was formed by applying the following composition C-2 to the alignment film. The applied coating film was heated using a hot plate at 70° C., the coating film was cooled to 25° C., and the coating film was irradiated with ultraviolet light having a wavelength of 365 nm at an irradiation dose of 500 mJ/cm² using a high-pressure mercury lamp in a nitrogen atmosphere. As a result, the alignment of the liquid crystal compound was immobilized. As a result, a λ plate was obtained.

Re(725) of the obtained λ plate at the wavelength λ=725 nm was 725 nm.

Preparation of 2λ Plate at λ=725 nm

A 2λ plate was obtained using the same preparation method as that of the λ plate, except that the thickness of the coating film of the liquid crystal compound was changed.

Re(725) of the obtained 2λ plate at the wavelength λ=725 nm was 1450 nm.

Preparation of Wavelength Selective Retardation Layer

The λ plate and the 2λ plate were laminated and bonded to each other such that the layer configuration was as shown in the following Table 1. During the lamination, the layers were sequentially laminated after peeling off the support and the alignment film.

As a result, a wavelength selective retardation layer that acted as a λ/2 plate for only green light and allowed transmission of the other light was prepared.

TABLE 1

| Number of Layers | X [nm] | Re(λ) [nm] | Re(450)/Re(550) | Slow Axis Direction [°] |
|---|---|---|---|---|
| 1 | 725 | 725 | 1.09 | −45 |
| 2 | 725 | 1450 | 1.09 | 74.3 |
| 3 | 725 | 1450 | 1.09 | −75.5 |
| 4 | 725 | 1450 | 1.09 | 86 |
| 5 | 725 | 1450 | 1.09 | −81.5 |
| 6 | 725 | 1450 | 1.09 | 89.6 |
| 7 | 725 | 1450 | 1.09 | −83.9 |
| 8 | 725 | 1450 | 1.09 | −88.5 |
| 9 | 725 | 1450 | 1.09 | −85.3 |

Polarizer

A commercially available linear polarizer was used.

Example 1

As the light guide plate, a glass plate having a size of 60 mm×70 mm and a thickness of 1 mm was prepared.

The R incidence diffraction element and the G incidence diffraction element were cut in a circular shape having a diameter of 6 mm. In addition, the R emission diffraction element and the G emission diffraction element were cut in a size of 20 mm×25 mm.

During the cutting of each of the diffraction elements, a cutting direction and a periodic direction of the diffraction structures were adjusted such that, in a case where the diffraction elements were disposed on the light guide plate, the periodic direction of the diffraction structure was a predetermined direction.

The cut R incidence diffraction element and the cut G incidence diffraction element were laminated and bonded to each other using an adhesive to form an incidence diffraction unit. Further, the formed incidence diffraction unit was bonded to the vicinity of an end part of the light guide plate. The bonding was performed such that the G incidence diffraction element faced the light guide plate side.

On the other hand, the cut R emission diffraction element and the G emission diffraction element were laminated and bonded to each other using an adhesive to form an emission diffraction unit. The formed emission diffraction unit was bonded to a position at a distance of 6 mm from the incidence diffraction unit of the light guide plate. The bonding was performed such that the G emission diffraction element faced the light guide plate side.

The incidence diffraction element was bonded in a state where a periodic direction of the diffraction element (the direction of the arrangement axis D) was adjusted to a direction in which diffracted light of light incident into the incidence diffraction element propagated to an emission diffraction element direction. In addition, the emission diffraction element was bonded in a state where the periodic direction of the diffraction element (the direction of the arrangement axis D) was parallel to the periodic direction of the incidence diffraction element and adjusted to a direction in which light diffracted by the incidence diffraction element and propagated in the light guide plate was diffracted and emitted to the outside of the light guide plate.

In this example and the following examples, the same adhesive was used for the bonding of the members.

In addition, in the incidence diffraction unit, the emission diffraction unit, and the intermediate diffraction unit, the periodic directions (the directions of the arrangement axes D) of the diffraction structures of the laminated diffraction elements matched each other.

The prepared retardation layer, the wavelength selective retardation layer, and the polarizer were cut in a size of 20×25 mm.

On a surface of the light guide plate opposite to the emission diffraction unit, the retardation layer, the wavelength selective retardation layer, and the polarizer were laminated in this order and bonded to prepare an optical member such that the centers thereof matched the center of the emission diffraction unit.

The wavelength selective retardation layer was provided such that a smaller number of layers in Table 1 was the light guide plate side. In addition, the retardation layer and the polarizer were laminated such that an angle between the slow axis of the retardation layer and the transmission axis of the polarizer was 45°.

Example 1B

An optical member was prepared using the same method as that of Example 1, except that it did not include the retardation layer.

Comparative Example 1

An optical member was prepared using the same method as that of Example 1, except that it did not include the retardation layer, the wavelength selective retardation layer, and the polarizer.

Example 2

An optical member was prepared using the same method as that of Example 1, except that the incidence diffraction unit was formed using the B incidence diffraction element instead of the R incidence diffraction element and the emission diffraction unit was formed using the B emission diffraction element instead of the R emission diffraction element.

The bonding to the light guide plate was performed such that the diffraction element corresponding to blue light faced the light guide plate side.

Example 2B

An optical member was prepared using the same method as that of Example 2, except that it did not include the retardation layer.

Comparative Example 2

An optical member was prepared using the same method as that of Example 2, except that it did not include the retardation layer, the wavelength selective retardation layer, and the polarizer.

Example 3

An optical member was prepared using the same method as that of Example 1, except that the incidence diffraction unit was formed using the B incidence diffraction element in addition to the R incidence diffraction element and the G incidence diffraction element and the emission diffraction unit was formed using the B emission diffraction element in addition to the R emission diffraction element and the G emission diffraction element.

The lamination order of the diffraction elements in the diffraction unit was the order of the diffraction element corresponding to blue light, the diffraction element corresponding to green light, and the diffraction element corresponding to red light from the light guide plate side.

Example 3B

An optical member was prepared using the same method as that of Example 2, except that it did not include the retardation layer.

Comparative Example 3

An optical member was prepared using the same method as that of Example 2, except that it did not include the retardation layer, the wavelength selective retardation layer, and the polarizer.

Example 4

The R intermediate diffraction element and the G intermediate diffraction element were cut in a size of 15 (maximum)×25 mm. During the cutting of each of the diffraction elements, a cutting direction and a periodic direction of the diffraction structures were adjusted such that, in a case where the diffraction elements were disposed on the light guide plate, the periodic direction of the diffraction structure was a predetermined direction.

The cut R intermediate diffraction element and the cut G intermediate diffraction element were laminated and bonded to each other using an adhesive to form an intermediate diffraction unit.

The same incidence diffraction unit and the same emission diffraction unit as those of Example 1 and the formed intermediate diffraction unit were bonded to the light guide plate in the arrangement shown in FIG. 14. The bonding to the light guide plate was performed such that the diffraction element corresponding to green light faced the light guide plate side.

The incidence diffraction unit and the intermediate diffraction unit were disposed to be spaced from each other by 1 mm in the left-right direction (the longitudinal direction of the light guide plate). The intermediate diffraction unit and the emission diffraction unit were disposed to be spaced from each other by 8 mm in the up-down direction (the width direction of the light guide plate).

An angle between the periodic direction (the direction of the arrangement axis D) of the diffraction structure in the incidence diffraction element and the periodic direction (the direction of the arrangement axis D) of the diffraction structure in the emission diffraction element was 90°. In addition, both of an angle of the periodic direction of the diffraction structure in the incidence diffraction element and an angle of the periodic direction of the diffraction structure in the emission diffraction element with respect to a line perpendicular to the periodic direction (the direction of the arrangement axis D) of the diffraction structure in the intermediate diffraction element were 45°.

On a surface of the light guide plate opposite to the emission diffraction unit, the retardation layer, the wavelength selective retardation layer, and the polarizer were bonded as in Example 1 to prepare an optical member such that the centers thereof matched the center of the emission diffraction unit.

Example 4B

An optical member was prepared using the same method as that of Example 4, except that it did not include the retardation layer.

Comparative Example 4

An optical member was prepared using the same method as that of Example 1, except that it did not include the retardation layer, the wavelength selective retardation layer, and the polarizer.

Example 5

An optical member was prepared using the same method as that of Example 4, except that the incidence diffraction unit was formed using the B incidence diffraction element instead of the R incidence diffraction element, the emission diffraction unit was formed using the B emission diffraction element instead of the R emission diffraction element, and the intermediate diffraction unit was formed using the B intermediate diffraction element instead of the R intermediate diffraction element.

The bonding to the light guide plate was performed such that the diffraction element corresponding to blue light faced the light guide plate side.

Example 5B

An optical member was prepared using the same method as that of Example 5, except that it did not include the retardation layer.

Comparative Example 5

An optical member was prepared using the same method as that of Example 5, except that it did not include the retardation layer, the wavelength selective retardation layer, and the polarizer.

Example 6

An optical member was prepared using the same method as that of Example 4, except that the incidence diffraction unit was formed using the B incidence diffraction element in addition to the R incidence diffraction element and the G incidence diffraction element, the emission incidence diffraction unit was formed using the B emission diffraction element in addition to the R emission diffraction element and the G emission diffraction element, and the intermediate diffraction unit was formed using the B intermediate diffraction element in addition to the R intermediate diffraction element and the G intermediate diffraction element.

The lamination order of the diffraction elements in the diffraction unit was the order of the diffraction element corresponding to blue light, the diffraction element corresponding to green light, and the diffraction element corresponding to red light from the light guide plate side.

Example 6B

An optical member was prepared using the same method as that of Example 6, except that it did not include the retardation layer.

Comparative Example 6

An optical member was prepared using the same method as that of Example 6, except that it did not include the retardation layer, the wavelength selective retardation layer, and the polarizer.

Evaluation

In each of the prepared optical members, multiple images were evaluated.

A projection display in which a projection light source and a convex lens were combined with LCOS was prepared. An image display apparatus was prepared in which a projection display was disposed to emit an image to the incidence diffraction unit. A circular polarization plate was disposed between the projection display and the incidence diffraction unit such that an image of right circularly polarized light was projected to the incidence diffraction unit.

An image was displayed using the prepared image display apparatus, and multiple images were evaluated based on the following standards.

A: the occurrence of multiple images was not substantially visually recognized

B: the occurrence of multiple images was weakly visually recognized but the degree thereof was within the allowable range C: the occurrence of multiple images was visually recognized and conspicuous The results are shown in the following table.

TABLE 2

| | | Comparative Example 1 | Example 1 | Example 1B | Comparative Example 2 | Example 2 | Example 2B | Comparative Example 3 | Example 3 | Example 3B |
|---|---|---|---|---|---|---|---|---|---|---|
| R Incidence Diffraction Element (First Incidence Diffraction Element) | $\lambda inR$ [μm] | 0.45 | 0.45 | 0.45 | — | — | — | 0.45 | 0.45 | 0.45 |
| | Pitch P [μm] | 0.43 | 0.43 | 0.43 | — | — | — | 0.43 | 0.43 | 0.43 |
| | Helical Twisted Direction | Right | Right | Right | — | — | — | Right | Right | Right |
| G Incidence Diffraction Element (Second Incidence Diffraction Element) | $\lambda inG$ [μm] | 0.39 | 0.39 | 0.39 | 0.39 | 0.39 | 0.39 | 0.39 | 0.39 | 0.39 |
| | Pitch P [μm] | 0.36 | 0.36 | 0.36 | 0.41 | 0.36 | 0.36 | 0.36 | 0.36 | 0.36 |
| | Helical Twisted Direction | Right | Right | Right | Right | Right | Right | Right | Right | Right |

TABLE 2-continued

| | | Comparative Example 1 | Example 1 | Example 1B | Comparative Example 2 | Example 2 | Example 2B | Comparative Example 3 | Example 3 | Example 3B |
|---|---|---|---|---|---|---|---|---|---|---|
| B Incidence Diffraction Element (First Incidence Diffraction Element) | ΛinB [μm] | — | — | — | 0.32 | 0.32 | 0.32 | 0.32 | 0.32 | 0.32 |
| | Pitch P [μm] | — | — | — | 0.31 | 0.31 | 0.31 | 0.31 | 0.31 | 0.31 |
| | Helical Twisted Direction | — | — | — | Right | Right | Right | Right | Right | Right |
| R Intermediate Diffraction Element (First Intermediate Diffraction Element) | ΛmidR [μm] | — | — | — | — | — | — | — | — | — |
| | Pitch P [μm] | — | — | — | — | — | — | — | — | — |
| | Helical Twisted Direction | — | — | — | — | — | — | — | — | — |
| G Intermediate Diffraction Element (Second Intermediate Diffraction Element) | ΛmidB [μm] | — | — | — | — | — | — | — | — | — |
| | Pitch P [μm] | — | — | — | — | — | — | — | — | — |
| | Helical Twisted Direction | — | — | — | — | — | — | — | — | — |
| B Intermediate Diffraction Element (First Intermediate Diffraction Element) | ΛmidB [μm] | — | — | — | — | — | — | — | — | — |
| | Pitch P [μm] | — | — | — | — | — | — | — | — | — |
| | Helical Twisted Direction | — | — | — | — | — | — | — | — | — |
| R Emission Diffraction Element (First Emission Diffraction Element) | ΛoutR [μm] | 0.45 | 0.45 | 0.45 | — | — | — | 0.45 | 0.45 | 0.45 |
| | Pitch P [μm] | 0.43 | 0.43 | 0.43 | — | — | — | 0.43 | 0.43 | 0.43 |
| | Helical Twisted Direction | Right | Right | Right | — | — | — | Right | Right | Right |
| G Emission Diffraction Element (Second Emission Diffraction Element) | ΛoutG [μm] | 0.39 | 0.39 | 0.39 | 0.39 | 0.39 | 0.39 | 0.39 | 0.39 | 0.39 |
| | Pitch P [μm] | 0.36 | 0.36 | 0.36 | 0.36 | 0.36 | 0.36 | 0.36 | 0.36 | 0.36 |
| | Helical Twisted Direction | Left | Left | Left | Left | Left | Left | Left | Left | Left |
| B Emission Diffraction Element (First Emission Diffraction Element) | ΛoutB [μm] | — | — | — | 0.32 | 0.32 | 0.32 | 0.32 | 0.32 | 0.32 |
| | Pitch P [μm] | — | — | — | 0.31 | 0.31 | 0.31 | 0.31 | 0.31 | 0.31 |
| | Helical Twisted Direction | — | — | — | Right | Right | Right | Right | Right | Right |
| Retardation Layer (λ/4 Plate) | | Not Provided | Provided | Not Provided | Not Provided | Provided | Not Provided | Not Provided | Provided | Not Provided |
| Wavelength Selective Retardation Layer | | Not Provided | Provided | Provided | Not Provided | Provided | Provided | Not Provided | Provided | Provided |
| Polarizer | | Not Provided | Provided | Provided | Not Provided | Provided | Provided | Not Provided | Provided | Provided |
| Evaluation | | C | A | B | C | A | B | C | A | B |

| | | Comparative Example 4 | Example 4 | Example 4B | Comparative Example 5 | Example 5 | Example 5B | Comparative Example 6 | Example 6 | Example 6B |
|---|---|---|---|---|---|---|---|---|---|---|
| R Incidence Diffraction Element (First Incidence Diffraction Element) | ΛinR [μm] | 0.45 | 0.45 | 0.45 | — | — | — | 0.45 | 0.45 | 0.45 |
| | Pitch P [μm] | 0.43 | 0.43 | 0.43 | — | — | — | 0.43 | 0.43 | 0.43 |
| | Helical Twisted Direction | Right | Right | Right | — | — | — | Right | Right | Right |
| G Incidence Diffraction Element (Second Incidence Diffraction Element) | ΛinG [μm] | 0.39 | 0.39 | 0.39 | 0.39 | 0.39 | 0.39 | 0.39 | 0.39 | 0.39 |
| | Pitch P [μm] | 0.36 | 0.36 | 0.36 | 0.41 | 0.36 | 0.36 | 0.36 | 0.36 | 0.36 |
| | Helical Twisted Direction | Right | Right | Right | Right | Right | Right | Right | Right | Right |
| B Incidence Diffraction Element (First Incidence Diffraction Element) | ΛinB [μm] | — | — | — | 0.32 | 0.32 | 0.32 | 0.32 | 0.32 | 0.32 |
| | Pitch P [μm] | — | — | — | 0.31 | 0.31 | 0.31 | 0.31 | 0.31 | 0.31 |
| | Helical Twisted Direction | — | — | — | Right | Right | Right | Right | Right | Right |

TABLE 2-continued

| | | | | | | | | | | | |
|---|---|---|---|---|---|---|---|---|---|---|---|
| R Intermediate Diffraction Element (First Intermediate Diffraction Element) | ΛmidR [μm] | 0.32 | 0.32 | 0.32 | — | — | — | 0.32 | 0.32 | 0.32 |
| | Pitch P [μm] | 0.48 | 0.48 | 0.48 | — | — | — | 0.48 | 0.48 | 0.48 |
| | Helical Twisted Direction | Right | Right | Right | — | — | — | Right | Right | Right |
| G Intermediate Diffraction Element (Second Intermediate Diffraction Element) | ΛmidB [μm] | 0.28 | 0.28 | 0.28 | 0.28 | 0.28 | 0.28 | 0.28 | 0.28 | 0.28 |
| | Pitch P [μm] | 0.41 | 0.41 | 0.41 | 0.41 | 0.41 | 0.41 | 0.41 | 0.41 | 0.41 |
| | Helical Twisted Direction | Right | Right | Right | Right | Right | Right | Right | Right | Right |
| B Intermediate Diffraction Element (First Intermediate Diffraction Element) | ΛmidB [μm] | — | — | — | 0.23 | 0.23 | 0.23 | 0.23 | 0.23 | 0.23 |
| | Pitch P [μm] | — | — | — | 0.34 | 0.34 | 0.34 | 0.34 | 0.34 | 0.34 |
| | Helical Twisted Direction | — | — | — | Right | Right | Right | Right | Right | Right |
| R Emission Diffraction Element (First Emission Diffraction Element) | ΛoutR [μm] | 0.45 | 0.45 | 0.45 | — | — | — | 0.45 | 0.45 | 0.45 |
| | Pitch P [μm] | 0.43 | 0.43 | 0.43 | — | — | — | 0.43 | 0.43 | 0.43 |
| | Helical Twisted Direction | Right | Right | Right | — | — | — | Right | Right | Right |
| G Emission Diffraction Element (Second Emission Diffraction Element) | ΛoutG [μm] | 0.39 | 0.39 | 0.39 | 0.39 | 0.39 | 0.39 | 0.39 | 0.39 | 0.39 |
| | Pitch P [μm] | 0.36 | 0.36 | 0.36 | 0.36 | 0.36 | 0.36 | 0.36 | 0.36 | 0.36 |
| | Helical Twisted Direction | Left | Left | Left | Left | Left | Left | Left | Left | Left |
| B Emission Diffraction Element (First Emission Diffraction Element) | ΛoutB [μm] | — | — | — | 0.32 | 0.32 | 0.32 | 0.32 | 0.32 | 0.32 |
| | Pitch P [μm] | — | — | — | 0.31 | 0.31 | 0.31 | 0.31 | 0.31 | 0.31 |
| | Helical Twisted Direction | — | — | — | Right | Right | Right | Right | Right | Right |
| Retardation Layer (λ/4 Plate) | | Not Provided | Provided | Not Provided | Not Provided | Provided | Not Provided | Not Provided | Provided | Not Provided |
| Wavelength Selective Retardation Layer | | Not Provided | Provided | Provided | Not Provided | Provided | Provided | Not Provided | Provided | Provided |
| Polarizer | | Not Provided | Provided | Provided | Not Provided | Provided | Provided | Not Provided | Provided | Provided |
| Evaluation | | C | A | B | C | A | B | C | A | B |

As shown in the table above, with the optical member according to the embodiment of the present invention, multiple image can be suppressed as compared to the optical members according to Comparative Examples not including the wavelength selective retardation layer and the polarizer.

In particular, as shown in Examples 1, 2, 3, 4, 5, and 6, multiple image can be more suitably suppressed by providing the retardation layer between the light guide plate and the wavelength selective retardation layer.

As can be seen from the above results, the effects of the present invention are obvious.

The present invention is suitably applicable to various uses where light is refracted in an optical device, for example, a diffraction element that causes light to be incident into a light guide plate of AR glasses or emits light to the light guide plate.

EXPLANATION OF REFERENCES

10, 50: optical member
12: light guide plate
14: incidence diffraction unit
14R: R incidence diffraction element
14G: G incidence diffraction element
14B: B incidence diffraction element
16: emission diffraction unit
16R: R emission diffraction element
16G: G emission diffraction element
16B: B emission diffraction element
18: retardation layer
20: wavelength selective retardation layer
24: polarizer
30: support
32: alignment film
34, 36: liquid crystal layer
40: liquid crystal compound
40A: optical axis
42: bright portion
44: dark portion
52: intermediate diffraction unit
60: exposure device
62: laser
64: light source
65: λ/2 plate
68: polarization beam splitter
70a, 70B: mirror
72A, 72B: λ/4 plate
$R_R$: right circularly polarized light of red light
M: laser light
MA, MB: beam P$_O$: linearly polarized light
P$_R$: right circularly polarized light
P$_L$: left circularly polarized light
L$_1$, L$_4$: incidence light
L$_2$, L$_5$: transmitted light
U: user
D: arrangement axis
Λ: single period (period of diffraction structure)
P: pitch

What is claimed is:

1. An optical member comprising:
a light guide element that includes a light guide plate, a first incidence diffraction element, a second incidence diffraction element, a first emission diffraction element, and a second emission diffraction element;
a wavelength selective retardation layer that functions as a retardation layer with respect to polarized light in a specific wavelength range, the wavelength selective retardation layer changing a polarized state of light diffracted by the first emission diffraction element or light diffracted by the second emission diffraction element; and
a polarizer,
wherein the first emission diffraction element and the second emission diffraction element are polarization diffraction elements and diffract light components such that the diffracted light components are polarized light components having opposite properties,
the first emission diffraction element, the second emission diffraction element, the wavelength selective retardation layer, and the polarizer are provided to overlap each other in a main surface of the light guide plate, and
the wavelength selective retardation layer is provided between the light guide element and the polarizer.

2. The optical member according to claim 1,
wherein at least one of a configuration in which the wavelength selective retardation layer is disposed to be spaced from the light guide element or a configuration in which the polarizer is disposed to be spaced from the wavelength selective retardation layer is satisfied.

3. The optical member according to claim 1,
wherein a period of a diffraction structure of the first incidence diffraction element and a period of a diffraction structure of the second incidence diffraction element are different from each other, and
a period of a diffraction structure of the first emission diffraction element and a period of a diffraction structure of the second emission diffraction element are different from each other.

4. The optical member according to claim 1,
wherein the first emission diffraction element and the second emission diffraction element include a liquid crystal diffraction layer that is formed of a composition including a liquid crystal compound and has a liquid crystal alignment pattern in which a direction of an optical axis derived from the liquid crystal compound changes while continuously rotating in at least one in-plane direction.

5. The optical member according to claim 4,
wherein the liquid crystal diffraction layers of the first emission diffraction element and the second emission diffraction element have a region where the direction of the optical axis of the liquid crystal compound is helically twisted and rotates in a thickness direction, and
a helically twisted rotation direction of the optical axis in the liquid crystal diffraction layer of the first emission diffraction element is different from a helically twisted rotation direction of the optical axis in the liquid crystal diffraction layer of the second emission diffraction element.

6. The optical member according to claim 4,
wherein the liquid crystal diffraction layers of the first emission diffraction element and the second emission diffraction element include a cholesteric liquid crystal layer obtained by immobilizing a cholesteric liquid crystalline phase, and
a helically twisted rotation direction of the optical axis in the cholesteric liquid crystalline phase of the liquid crystal diffraction layer of the first emission diffraction element is different from a helically twisted rotation direction of the optical axis in the cholesteric liquid crystalline phase of the liquid crystal diffraction layer of the second emission diffraction element.

7. The optical member according to claim 4,
wherein in the liquid crystal diffraction layers of the first emission diffraction element and the second emission diffraction element, in a case where an in-plane retardation is measured from a normal direction of a main surface and a direction tilted with respect to a normal line of the main surface, a direction in which the in-plane retardation is minimum in any one of a slow axis plane or a fast axis plane is tilted from the normal direction.

8. The optical member according to claim 1,
wherein the wavelength selective retardation layer functions as a ½ wave plate with respect to the polarized light in the specific wavelength range.

9. The optical member according to claim 1,
wherein a retardation layer is provided between the light guide element and the polarizer.

10. The optical member according to claim 9,
wherein the retardation layer is a ¼ wave plate.

11. The optical member according to claim 9,
wherein the retardation layer has reverse wavelength dispersibility.

12. The optical member according to claim 1,
wherein periods of diffraction structures of the first incidence diffraction element, the second emission diffraction element, the first emission diffraction element, and the second emission diffraction element are 0.1 to 10 μm.

13. The optical member according to claim 1,
wherein the first emission diffraction element and the second emission diffraction element are laminated.

14. The optical member according to claim 1,
wherein the first incidence diffraction element and the second incidence diffraction element are laminated.

15. The optical member according to claim 1,
wherein the first incidence diffraction element and the second incidence diffraction element are disposed at different positions in the main surface of the light guide plate.

16. An image display apparatus comprising:
the optical member according to claim 1; and
a display element that emits an image to the first incidence diffraction element and the second incidence diffraction element of the light guide element of the optical member.

17. The optical member according to claim 2,
wherein a period of a diffraction structure of the first incidence diffraction element and a period of a diffraction structure of the second incidence diffraction element are different from each other, and a period of a diffraction structure of the first emission diffraction element and a period of a diffraction structure of the second emission diffraction element are different from each other.

18. The optical member according to claim 2,
wherein the first emission diffraction element and the second emission diffraction element include a liquid crystal diffraction layer that is formed of a composition including a liquid crystal compound and has a liquid crystal alignment pattern in which a direction of an optical axis derived from the liquid crystal compound changes while continuously rotating in at least one in-plane direction.

19. The optical member according to claim 18,
wherein the liquid crystal diffraction layers of the first emission diffraction element and the second emission diffraction element have a region where the direction of the optical axis of the liquid crystal compound is helically twisted and rotates in a thickness direction, and
a helically twisted rotation direction of the optical axis in the liquid crystal diffraction layer of the first emission diffraction element is different from a helically twisted rotation direction of the optical axis in the liquid crystal diffraction layer of the second emission diffraction element.

20. The optical member according to claim 18,
wherein the liquid crystal diffraction layers of the first emission diffraction element and the second emission diffraction element include a cholesteric liquid crystal layer obtained by immobilizing a cholesteric liquid crystalline phase, and
a helically twisted rotation direction of the optical axis in the cholesteric liquid crystalline phase of the liquid crystal diffraction layer of the first emission diffraction element is different from a helically twisted rotation direction of the optical axis in the cholesteric liquid crystalline phase of the liquid crystal diffraction layer of the second emission diffraction element.

* * * * *